(12) United States Patent
Shiomi et al.

(10) Patent No.: US 8,212,842 B2
(45) Date of Patent: Jul. 3, 2012

(54) DISPLAY PROCESSING DEVICE

(75) Inventors: Takakazu Shiomi, Osaka (JP); Yasuhiro Yoshida, Lawrenceville, NJ (US)

(73) Assignee: Panasonic Corporation, Osaka (JP)

( * ) Notice: Subject to any disclaimer, the term of this patent is extended or adjusted under 35 U.S.C. 154(b) by 837 days.

(21) Appl. No.: 10/598,183

(22) PCT Filed: Feb. 9, 2005

(86) PCT No.: PCT/JP2005/001967
§ 371 (c)(1),
(2), (4) Date: Nov. 27, 2006

(87) PCT Pub. No.: WO2005/081527
PCT Pub. Date: Sep. 1, 2005

(65) Prior Publication Data
US 2007/0143789 A1   Jun. 21, 2007

(30) Foreign Application Priority Data

Feb. 23, 2004   (JP) .................................. 2004-045883

(51) Int. Cl.
*G09G 5/00*   (2006.01)
(52) U.S. Cl. ............. 345/629; 725/44; 725/43; 345/636; 348/589
(58) Field of Classification Search .................. 715/766; 345/9, 629; 725/43, 44
See application file for complete search history.

(56) References Cited

U.S. PATENT DOCUMENTS

| | | | |
|---|---|---|---|
| 5,434,590 A * | 7/1995 | Dinwiddie et al. ........... | 345/634 |
| 5,519,449 A | 5/1996 | Yanai et al. | |
| 5,522,025 A | 5/1996 | Rosenstein | |
| 5,900,859 A * | 5/1999 | Takishita et al. ............. | 345/629 |
| 6,389,487 B1 | 5/2002 | Grooters | |
| 6,750,858 B1 | 6/2004 | Rosenstein | |
| 6,771,319 B2 | 8/2004 | Konuma | |
| 6,961,061 B1 * | 11/2005 | Johnson et al. ............... | 345/473 |
| 2002/0047917 A1 * | 4/2002 | Hirano ........................ | 348/397.1 |
| 2002/0085122 A1 | 7/2002 | Konuma | |
| 2002/0171765 A1 * | 11/2002 | Waki et al. .................... | 348/589 |
| 2003/0080958 A1 * | 5/2003 | Matsumoto et al. .......... | 345/421 |

(Continued)

FOREIGN PATENT DOCUMENTS

DE   4231158   3/1993

(Continued)

OTHER PUBLICATIONS

English Language Abstract of JP 2003-219372.

(Continued)

*Primary Examiner* — Michelle L Sams
(74) *Attorney, Agent, or Firm* — Greenblum & Bernstein, P.L.C.

(57) ABSTRACT

A display processor increases graphics display performance. The display processor includes: an OSD plane having a first OSD area and a second OSD area for storing graphics images; and a Z-order manager, which stores a vertical order assigned to the first OSD area and the second OSD area, and which provides a notification regarding that vertical order. This display processor also includes a CPU, which executes a downloaded application, thereby storing the graphics images in the first OSD area and the second OSD area based on the vertical order notified by the Z-order management unit; and a display which superimposes the graphics images stored in the first OSD area and the second OSD area in accordance with the abovementioned vertical order, and displays the images.

3 Claims, 22 Drawing Sheets

U.S. PATENT DOCUMENTS

| | | | |
|---|---|---|---|
| 2003/0142236 A1 | 7/2003 | Aratani et al. | |
| 2003/0193512 A1* | 10/2003 | Komagata | 345/629 |
| 2004/0263690 A1* | 12/2004 | Holland | 348/569 |
| 2005/0012761 A1 | 1/2005 | Shiomi et al. | |

FOREIGN PATENT DOCUMENTS

| | | |
|---|---|---|
| EP | 1185091 | 3/2002 |
| EP | 1331812 | 7/2003 |
| JP | 4-021077 | 1/1992 |
| JP | 5-173745 | 7/1993 |
| JP | 7-073287 | 3/1995 |
| JP | 9-247565 | 9/1997 |
| JP | 2000-305549 | 11/2000 |
| JP | 2002-064761 | 2/2002 |
| JP | 2003-101900 | 4/2003 |
| JP | 2003-219372 | 7/2003 |
| WO | 95/12194 | 5/1995 |

OTHER PUBLICATIONS

English Language Abstract of JP 2003-101900.
English Language Abstract of JP 7-073287.
English Language Abstract of JP 4-021077.
English Language Abstract of JP 2000-305549.
English Language Abstract of JP 2002-064761.
ETSI TS 101 812 v1.2.1 (Jun. 2002), Technical Specification, "Digital Video Broadcasting (DVB); Multimedia Home Platform (MHP) Specification 1.0.2," pp. 188-207 and 752.
HAVi Inc., "The HAVi Specification: Specification of the Home AudioNideo Interoperability (HAVi) Architecture, Chapter 8—Level 2 User Interface," version 1.1, May 15, 2001, pp. 1-12.
HAVi Inc., "HAVi Java APIs 1.1," May 15, 2001.
English language Abstract of JP 9-247565, Sep. 19, 1997.
English language Abstract of JP 5-173745, Jul. 13, 1993.

* cited by examiner

FIG. 10A

| | 801 | 802 | 803 |
|---|---|---|---|
| 811 | Address for First OSD Area 671 | 1 | HGraphicsDevice A |
| 812 | Address for Second OSD Area 672 | 2 | HGraphicsDevice B |

FIG. 10B

| | 821 | 822 | 823 |
|---|---|---|---|
| 831 | Address for First Video Area 651 | 1 | HVideoDevice A |
| 832 | Address for Second Video Area 652 | 2 | HVideoDevice B |

FIG. 10C

| | 841 | 842 | 843 |
|---|---|---|---|
| 851 | Address for First Still Area 661 | 1 | HBackgroundDevice A |

```
1   HGraphicsDevice[] device
2           = Hscreen.getHGraphicsDevice();
3   HSceneFactory f = HSceneFactory.getInstance();
4   Hscene s0 = f.getFullScreenScene(device[0]);
5   Graphics g = s0.getGraphics();
6   g.setColor(Color.black);
7   g.drawString("Graphics" , 30, 30);
8
9   Hscene s1 = f.getFullScreenScene(device[1]);
10  Graphics g = s1.getGraphics();
11  g.setColor(Color.white);
12  g.FillRect(0,0,s1.getWidth(), s1.getHeight());
```

FIG. 16

| 1 | HVideoDevice[] device |
| 2 |     = Hscreen.getHVideoDevice(); |
| 3 | Player p1 = device[0].getVideoController(); |
| 4 | |
| 5 | Player p2 = device[1].getVideoController(); |

FIG. 17

| 1 | HBackgroundDevice[] device |
| 2 |     = Hscreen.getHBackgroundDevices(); |
| 3 | HBackgroundConfiguration c = |
| 4 |     device[0].getCurrentConfiguration(); |
| 5 | c.setColor(Color.blue); |

FIG. 21
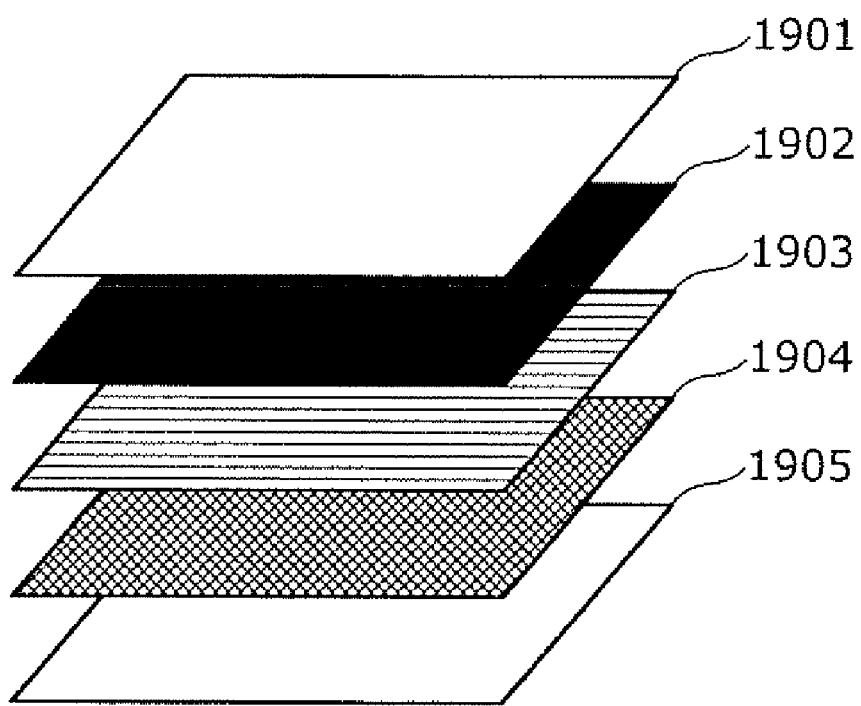
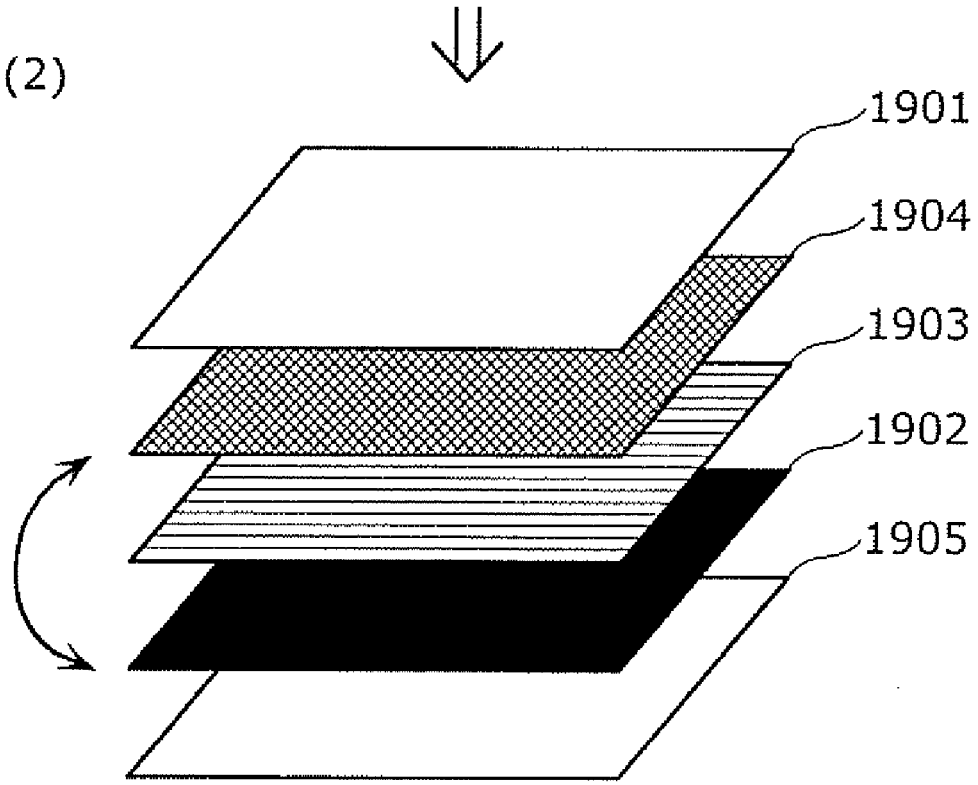

FIG. 25

| | 2301 | 2302 | 2303 |
|---|---|---|---|
| 2311 | Address for First OSD Area 671 | 1 | HGraphicsDevice A |
| 2312 | Address for First Video Area 651 | 2 | HVideoDevice A |
| 2313 | Address for Second OSD Area 672 | 3 | HGraphicsDevice B |
| 2314 | Address for Second Video Area 652 | 4 | HVideoDevice B |
| 2315 | Address for First Still Area 661 | 5 | HBackgroundDevice A |

DISPLAY PROCESSING DEVICE

TECHNICAL FIELD

The present invention relates to a display processing device that downloads an application program and displays an image based on that application program.

BACKGROUND ART

In the past, a display processing device that downloads an application program (hereafter, simply "application") and displays an image based on that application has been provided, a representative example being a digital television terminal.

Technology regarding such a display processing device, which downloads an application and executes the application, is prescribed in Non-Patent Reference 1 (the DVB-MHP standard (ETSITS 101812 DVB-MHP specifications V 1.0.2), which is the European digital television standard), Non-Patent References 2 and 3 (the Home Audio Video Interoperability (HAVi) standard, which is a standard for digital consumer A/V appliances), and so on, and is publicly-known technology. The DVB-MHP standard employs the AWT and the Java Media Framework (JMF), which are lava (R) class libraries, and the HAVi Level 2 GUI, as defined in the HAVi standard. In addition, the DVB-MHP standard prescribes an Application Program Interface (API), and through this API, a downloaded application can control a display processing device that includes an On-Screen Display (OSD) plane, a video plane, and a still plane. For details, refer to the DVB-MHP specifications and chapter 8 of the HAVi specifications.

Hereafter, a general overview shall be given regarding a display processing device used in the DVB-MHP standard.

FIG. 1 is a conceptual diagram showing a downloaded application 2410 and a display processing device 2420.

The display processing device 2420 is configured of an OSD control unit 2421, an OSD plane 2422, a video control unit 2431, a video plane 2432, a still control unit 2441, a still plane 2442, and a display 2450.

The OSD control unit 2421 is configured of software and provides an API so that the downloaded application 2410 can render graphics. Through this API, the OSD control unit 2421, which has been instructed to render graphics, renders the graphics, resulting in the generated rendered image being stored in the OSD plane 2422.

The OSD plane 2422 is configured of a memory or the like, and stores the rendered image generated by the OSD 2421.

The video control unit 2431 is configured of software and provides an API so that the downloaded application 2410 can reproduce video. Through this API, the video control unit 2431, which has been instructed to reproduce video, reproduces the video, and stores the reproduced video in the video plane 2432. Decoding a video signal sent as an MPEG-2 and converting it into a displayable format can be given as a specific example of video reproduction.

The video plane 2432 is configured of a memory or the like, and stores the video reproduced by the video control unit 2431.

The still control unit 2441 is configured of software and provides an API so that the downloaded application 2410 can render a background image. Through this API, the still control unit 2441, which has been instructed to render a background image, renders the background image, and stores the generated background image in the still plane 2442. Decoding of MPEG-I data and single-color filling can be given as specific examples of processing for rendering a background image.

The still plane 2442 is configured of a memory or the like, and stores the background image generated by the still control unit 2441.

The display 2450 superimposes the image stored in the video plane 2432 on the image stored in the still plane 2442, and after that, further superimposes the image stored in the OSD plane on the previous superimposed image; the display 2450 then displays a final synthesized image.

FIG. 2 is a diagram showing each image synthesized by the display 2450 and the synthesized image that is ultimately displayed. Here, the images stored in the still plane 2442, the video plane 2432, and the OSD plane 2422 are synthesized and displayed.

FIG. 2 (1) is an image stored in the OSD plane 2422. In FIG. 2 (1), the OSD plane 2422 stores an image that includes graphics content 2501, which shows a list of channels, and graphics content 2502, which shows TV program details. Note that in this image, information indicating transparency is stored in the areas aside from the graphics content 2501 and 2502. Here, "graphics content" refers to figures, characters, or the like that are rendered in the OSD plane through the downloaded application 2410 calling the API.

FIG. 2 (2) is an image stored in the video plane 2432. In FIG. 2 (2), the video plane 2432 stores an image that includes video 2503, which is reproduced at ¼ the size of the screen in the upper-right corner of the screen. In this image, information indicating transparency is stored in the areas aside from the video 2503.

FIG. 2 (3) is an image stored in the still plane 2442. In FIG. 2 (3), the still plane 2442 stores a background 2504, which is filled with a single color, as an image.

FIG. 2 (4) shows the result of the display 2450 synthesizing the image stored in the OSD plane 2422 shown in FIG. 2 (1), the image stored in the video plane 2432 shown in FIG. 2 (2), and the image stored in the still plane 2442 shown in FIG. 2 (3). Specifically, the display 2450 superimposes the video 2503 stored in the video plane, as shown in FIG. 2 (2), on the background 2504 stored in the still plane 2442, as shown in FIG. 2 (3); the display 2450 then superimposes the graphics contents 2501 and 2502 stored in the OSD plane 2422 shown in FIG. 2 (1), and displays the final image.

Non-Patent Reference 1: ETSITS 101812 DVB-MHP Specifications v1.0.2
Non-Patent Reference 2: HAVi v1.1, Chapter 8, May 15, 2001
Non-Patent Reference 3: HAVi v1.1 Java (R) L2 APIs, May 15, 2001

DISCLOSURE OF INVENTION

Problems that Invention is to Solve

However, with the conventional display processing device, there is a problem in that graphics display performance is poor.

In the conventional art, only one each of the OSD plane, video plane, and still plane are included, and thus it is impossible to improve the graphics display performance. For example, it is difficult to superimpose and display two kinds of animations. Note that the same applies to the video plane and the still plane.

Accordingly, an object of the present invention, which has been conceived in light of the aforementioned problem, is to provide a display processing device with an improved graphics display performance.

Means to Solve the Problems

To solve the abovementioned problems, the display processing device according to the present invention is a display processing device which downloads a program and displays an image based on the downloaded program, and includes: a plurality of graphics image storage units, each having an area for storing a graphics image; a first order storage unit which stores a first order assigned to the graphics image storage units; a notification unit which provides a notification regarding the first order stored in the first order storage unit; a program execution unit which stores graphics images in the graphics image storage units based on the first order notified by the notification unit, by executing the program; and a display unit that superimposes and displays the graphics images stored in the graphics image storage units according to the first order.

In the case where two graphics images are synthesized and displayed, conventionally, the two graphics images are synthesized and stored in a single area within a single plane (storage unit), and the synthesized image is displayed, through processing performed by a program. Therefore, the program must perform rendering taking into consideration the superimposition of the two graphics images, which slows the processing speed of the program; in addition, it is difficult to develop a program that performs this kind of rendering processing. However, with the present invention as described above, processing by the program only requires storing the graphics images in each graphics image storage unit; thus it is possible to improve processing speed and increase graphics image display performance. Moreover, the program is notified of the first order, and therefore the program can store the appropriate graphics image in the appropriate graphics image storage unit, thus making it possible to display a correct synthesized image in the display unit. For example, with animation, video game machines, and the like, it is possible to quickly and correctly synthesize and display a graphics image showing a fighter plane and a graphics image showing flames rising from a building attacked by the fighter plane; it is also possible to smoothly display continuous changes occurring in such synthesized images. Also, since rendering processing taking into consideration the superimposition of plural graphics images is not necessary, the workload required to develop the program can be reduced.

In addition, the notification unit may notify the program execution unit of the first order by arranging identification information for identifying each of the graphics image storage units in an array according to the first order stored in the first order storage unit, and pass the array to the program execution unit. For example, the first order storage unit may store a position of the graphics image storage unit within the first order, and the identification information, for each of the graphics image storage units.

Through this, identification information arrayed in accordance with the first order is passed to the program execution unit, and therefore the program execution unit can easily know the first order assigned to the plural graphics image storage units through the array. It is also possible to store the correct graphics image in each graphics image storage unit based on the first order.

In addition, the display processing device may further include a changing unit which changes the first order stored in the first order storage unit, and the notification unit may notify the program execution unit of the changed first order. For example, the changing unit may change the position of each graphics image storage unit stored in the first order storage unit. To be more specific, the changing unit may interchange the positions of two of the graphics image storage units stored in the first order storage unit.

Through this, for example, when using a graphics image showing clouds, and a graphics image showing an airplane, it is possible to quickly and easily change the superimposition order of the graphics images, so as to show the airplane hidden within the clouds, the airplane in front of the clouds, and so on.

In addition, the display processing device may further include a plurality of video image storage units, each having an area for storing a video image, and a second order storage unit which stores a second order assigned to the video image storage units. The notification unit may further notify the program execution unit of the second order stored in the second order storage unit; the program execution unit may further store video images in each of the video image storage units based on the second order notified by the notification unit, by executing the program; and the display unit may superimpose and display the video images stored in the video image storage units according to the second order on the graphics images superimposed according to the first order.

Through this, plural video images are stored in each video image storage unit through the processing performed by the program, in the same manner as the abovementioned plural graphics images; therefore, processing by the program only requires storing the graphics images and the video images in each graphics image storage unit and each video image storage unit respectively. Rendering processing taking into consideration the superimposition of each image is therefore unnecessary, and thus it is possible to improve processing speed and increase graphics image and video image display performance. Moreover, the program is notified of the second order, and therefore the program can store the appropriate video image in the appropriate video image storage unit, thus making it possible to display a correct synthesized image in the display unit. For example, with a video game machine, it is possible to quickly and correctly synthesize and render a graphics image showing a fighter plane, a graphics image showing flames rising from a building attacked by the fighter plane, and a video image of a user operating the video game machine; it is also possible to smoothly display continuous changes occurring in such synthesized images. Also, since rendering processing taking into consideration the superimposition of plural graphics images and video images is not necessary, the workload required to develop the program can be reduced.

In addition, the display processing device may further include a plurality of still image storage units, each having an area for storing a still image, and a third order storage unit which stores a third order assigned to the still image storage units. The notification unit may further notify the program execution unit of the third order stored in the third order storage unit; the program execution unit may further store still images in each of the still image storage units based on the third order notified by the notification unit, by executing the program; and the display unit may superimpose and display the still images stored in the still image storage units according to the third order on the graphics images and video images superimposed according to the first and second orders respectively.

Through this, plural still images are stored in each still image storage unit through the processing performed by the program, in the same manner as the abovementioned plural graphics images; therefore, processing by the program only requires storing the graphics images, video images, and still images in each graphics image storage unit, video image storage unit, and still image storage unit, respectively. Rendering processing taking into consideration the superimposition of each image therefore is unnecessary, and thus it is possible to improve processing speed and increase graphics image, video image, and still image display performance.

Moreover, the program is notified of the third order, and therefore the program can store the appropriate still image in the appropriate still image storage unit, thus making it possible to display a correct synthesized image in the display unit. For example, with a video game machine, it is possible to quickly and correctly synthesize and render a graphics image showing a fighter plane, a graphics image showing flames rising from a building attacked by the fighter plane, a video image of a user operating the video game machine, and a still image showing a background behind the fighter plane; it is also possible to smoothly display continuous changes occurring in such synthesized images. Also, since rendering processing taking into consideration the superimposition of plural graphics images, video images, and still images is not necessary, the workload required to develop the program can be reduced.

In addition, the display processing device may further include a video image storage unit having an area for storing a video image, and a still image storage unit having an area for storing a still image. The first order storage unit may store the first order assigned to the graphics image storage units, the video image storage unit, and the still image storage unit; the program execution unit may store graphics images in each of the graphics image storage units, a video image in the video image storage unit, and a still image in the still image storage unit, based on the first order notified by the notification unit, by executing the program; and the display unit may superimpose and display the graphics images, the video image, and the still image stored in the graphics image storage units, the video image storage unit, and the still image storage unit respectively according to the first order.

Through this, the video image and the still image are superimposed with plural graphics images and displayed, and thus it is possible to expand the display details of the synthesized image displayed by the display unit. Moreover, the program is notified of the first order assigned to the plural graphics image storage units, the video image storage unit, and the still image storage unit; therefore, it is possible for the program to store the appropriate image in the appropriate storage unit and cause the display unit to display a correct synthesized image.

In addition, the display processing device may further include a changing unit which changes the first order stored in the first order storage unit, and the notification unit may notify the program execution unit of the changed first order, For example, the changing unit may change the first order stored in the first order storage unit so that the graphics images sandwich at least one of the video image and the still image when the graphics images, video image, and still image are superimposed.

Through this, it is possible to quickly and easily change the superimposition order of each image. For example, images are superimposed and displayed so that a video image is sandwiched between two graphics images, thus improving the expandability of the display details.

Note that the present invention can be realized not only as this kind of display processing device, but also as a method or program performed by the display processing device, as well as a storage medium which stores the program.

Effects of the Invention

The display processing device of the present invention has an advantageous effect in that it is possible to improve graphics display performance.

BRIEF DESCRIPTION OF DRAWINGS

FIG. 10A is a diagram showing an example of a management table that is managed by a Z-order management unit according to the first embodiment of the present invention.

FIG. 10B is a diagram showing an example of a management table that is managed by another Z-order management unit according to the first embodiment of the present invention.

FIG. 10C is a diagram showing an example of a management table that is managed by yet another Z-order management unit according to the first embodiment of the present invention.

FIG. 16 is a diagram showing another example of application code according to the first embodiment of the present invention.

FIG. 17 is a diagram showing yet another example of application code according to the first embodiment of the present invention.

FIG. 21 is a diagram showing a method for changing the vertical order of areas in the first embodiment of the present invention.

FIG. 25 is a diagram showing an example of a management table that is managed by a Z-order management unit according to the second embodiment of the present invention.

Figure 1:
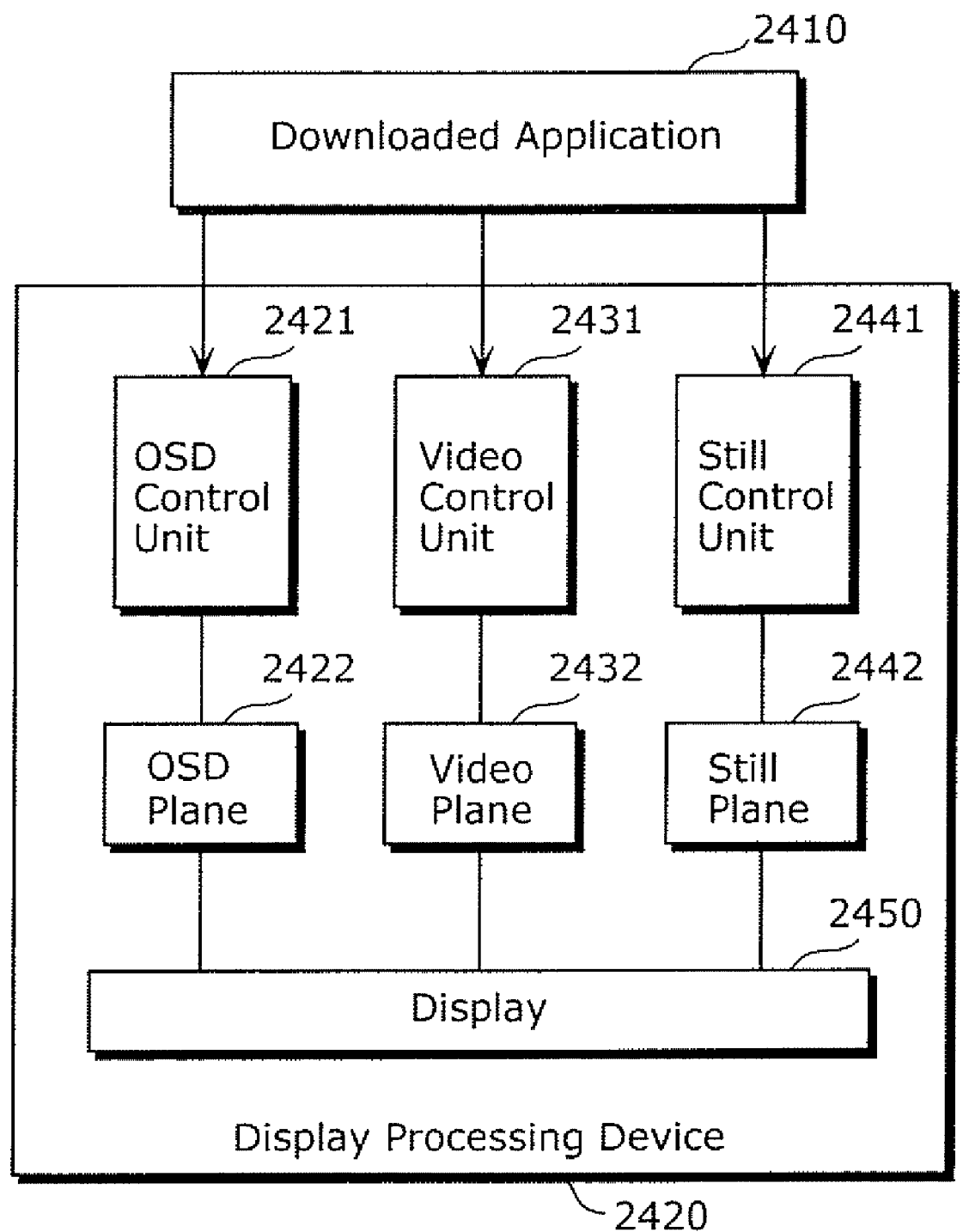
FIG. 1 is a diagram showing a configuration of a conventional display processing device.
Figure 2:
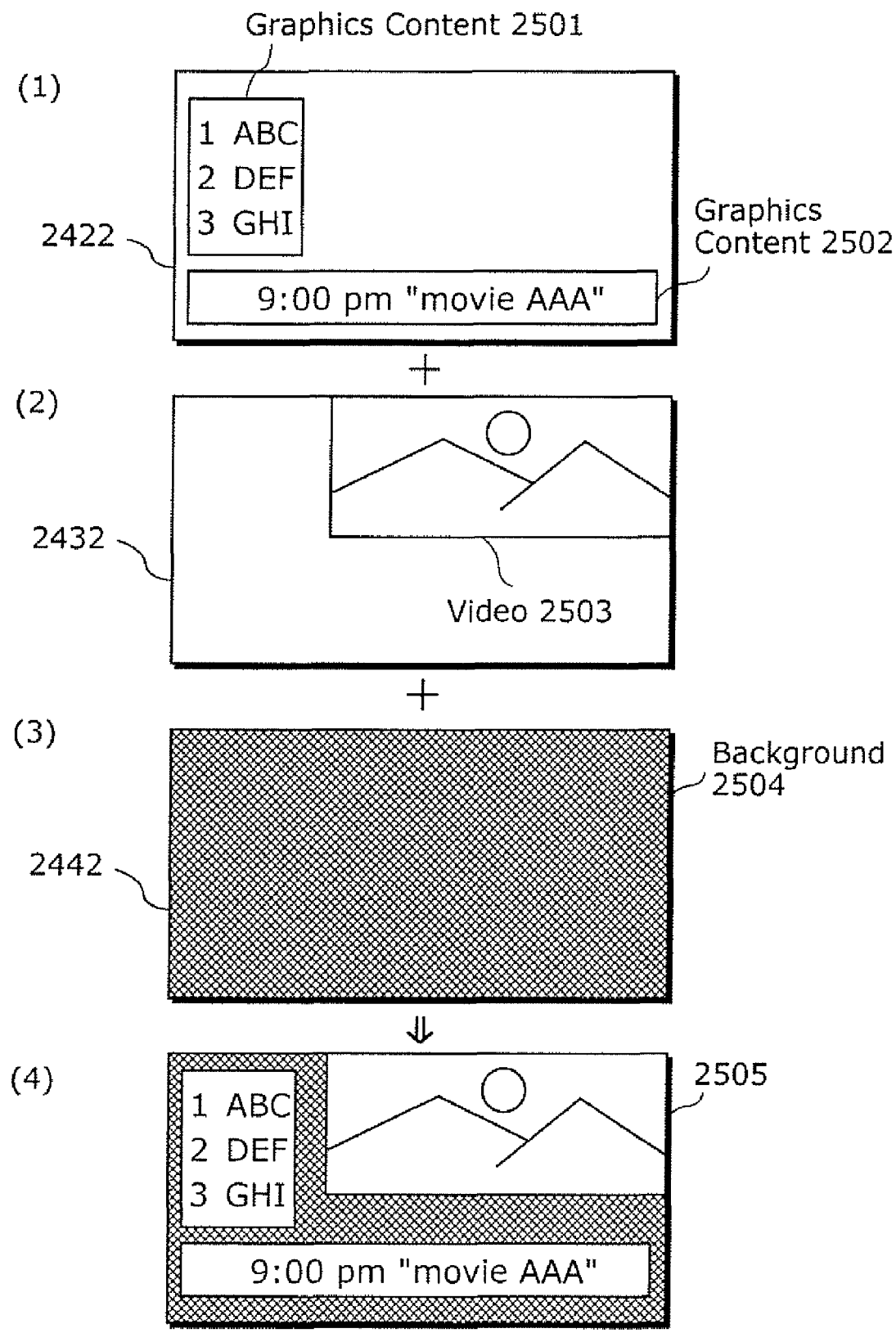
FIG. 2 is a diagram showing plural images being synthesized.

NUMERICAL REFERENCES 209 video plane
210 still plane
211 OSD plane
212 display
505h OSD processing unit
505i video processing unit
505j still processing unit
506 downloaded application
601 Z-order management unit
602 Z-order changing unit
611 Z-order management unit
612 Z-order changing unit
621 Z-order management unit
622 Z-order changing unit
651 first video area
652 second video area
661 first still area
671 first OSD area
672 second OSD area

BEST MODE FOR CARRYING OUT THE INVENTION

First Embodiment

The embodiment of a cable television system in the present invention shall be explained with reference to the diagrams.

Figure 3:
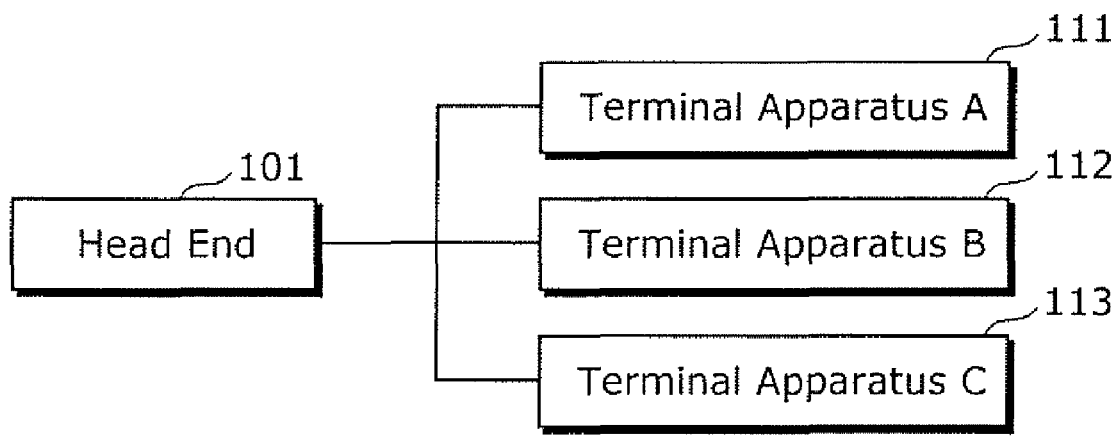
FIG. 3 is a block diagram showing a cable television system according to the first embodiment of the present invention.

FIG. 3 is a block diagram showing a relationship between apparatuses that make up a cable television system. This cable television system is configured of a head end 101 and three display processing devices: a terminal apparatus A111 a terminal apparatus B112, and a terminal apparatus C113. In the present embodiment, three terminal apparatuses are connected to one head end 101, but it is possible to implement the present invention even with an arbitrary number of terminal apparatuses being connected to the head end 101.

The head end 101 transmits, to plural terminal apparatuses, broadcast signals such as video, audio and data, and receives data transmitted from the terminal apparatuses.

The present invention relates mainly to the terminal apparatuses, and therefore detailed descriptions regarding the head end are omitted.

The terminal apparatuses A111, B112, and C113 each receive and reproduce broadcast signals transmitted from the head end 101. Furthermore, each terminal apparatus transmits data unique to each terminal apparatus to the head end 101. In the present embodiment, these three terminal apparatuses shall have the same configuration.

Figure 4:
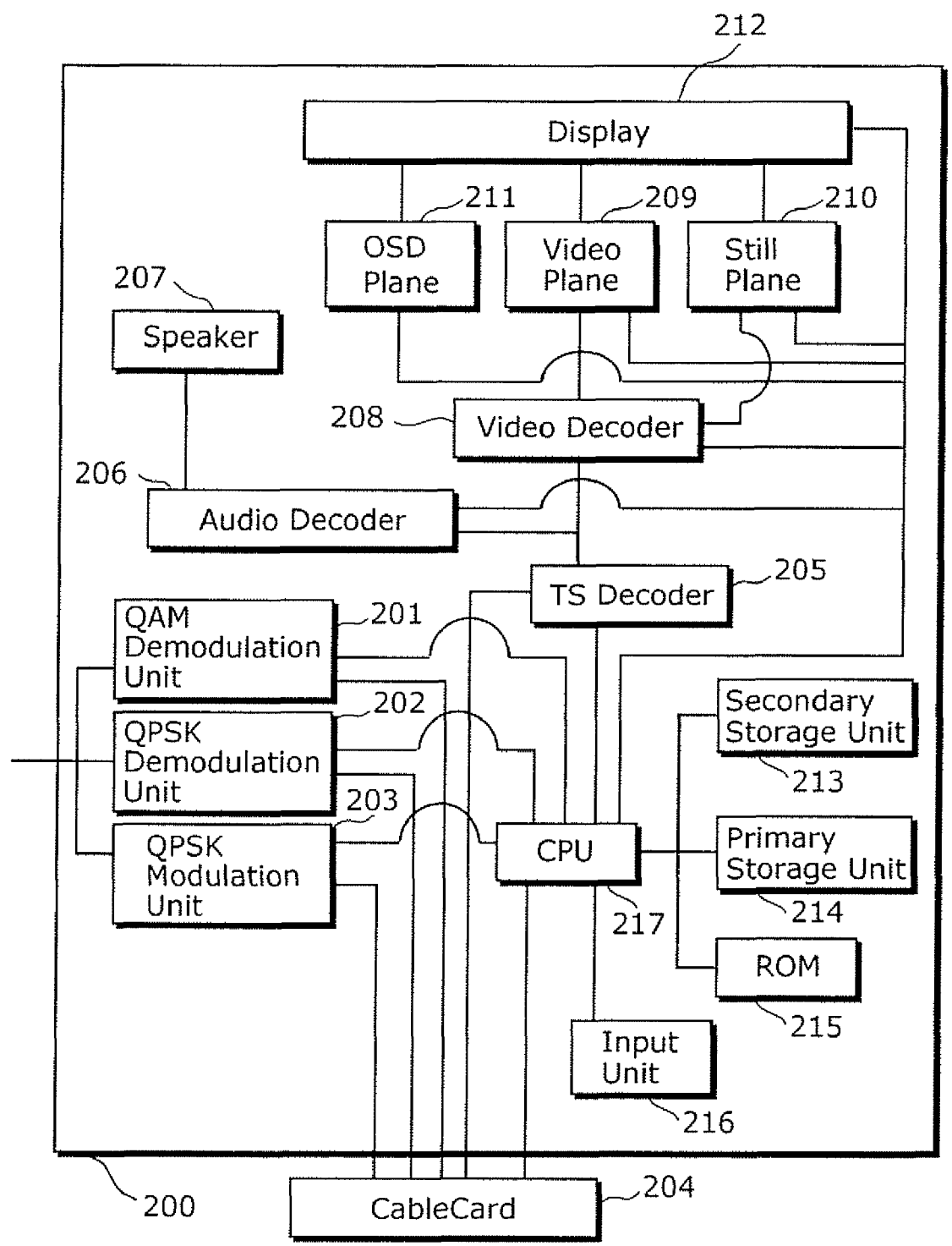
FIG. 4 is a diagram showing a configuration of a terminal apparatus according to the present invention.

FIG. 4 is a block diagram showing a hardware configuration of each terminal apparatus. A terminal apparatus 200 is configured of: a QAM demodulating unit 201, a QPSK demodulating unit 202, a QPSK modulating unit 203, a TS decoder 205, an audio decoder 206, a speaker 207, a video decoder 208, a video plane 209, a still plane 210, an OSD plane 211, a display 212, a secondary storage unit 213, a primary storage unit 214, a RON 215, an input unit 216, and a CPU 217. In addition, a CableCard 204 is attached to/detached from the terminal apparatus 200.

Figure 5:
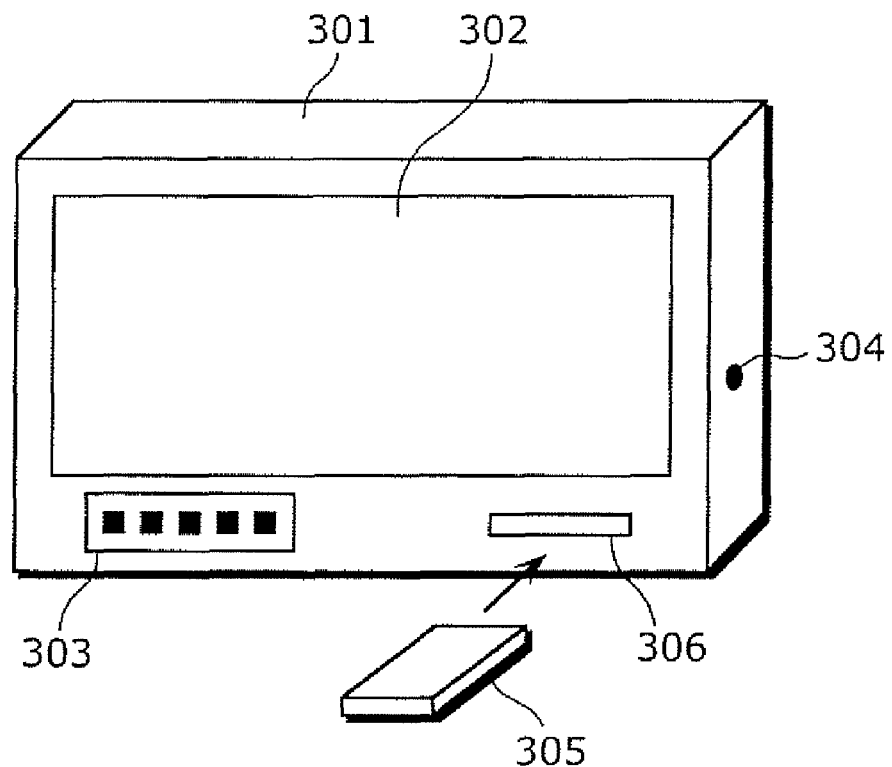
FIG. 5 is a diagram showing an example of the external appearance of the terminal apparatus according to the first embodiment of the present invention.

FIG. 5 is a diagram showing an example of the external appearance of the terminal apparatus 200 configured as a flat-panel television.

Aside from the CableCard 204, all of the constituent elements of the terminal apparatus 200 are built into a housing 301 of the flat-screen television.

The display 302 is equivalent to the display 212 in FIG. 4. The front panel unit 303 is configured of plural buttons, and is equivalent to the input unit 216 of FIG. 4.

A signal input terminal 304 connects to a cable line to send signals to/receive signals from the head end 101. The signal input terminal 304 is connected to the QAM demodulation unit 201, the QPSK demodulation unit 202, and the QPSK modulation unit 203 shown in FIG. 4.

The CableCard 305 is equivalent to the CableCard 204 of FIG. 4. The CableCard 204 is embodied independently of the terminal apparatus 200 and can be attached to/detached from the terminal apparatus 200, as in the case of the CableCard 305 in FIG. 5. The CableCard 204 shall be described in detail later.

The CableCard 305 is inserted into an insertion slot 306. As shown in FIG. 4, the QAM demodulation unit 201 demodulates a signal which has been QAM-modulated in and transmitted from the head end 101, according to tuning information that includes a frequency specified by the CPU 217, and passes the resultant to the CableCard 204.

The QPSK demodulation unit 202 demodulates a signal which has been QPSK-modulated in and transmitted from the head end 101, according to tuning information that includes a frequency specified by the CPU 217, and passes the resultant to the CableCard 204.

The QPSK modulation unit 203 QPSK-demodulates a signal passed from the CableCard 204, according to demodulation information that includes a frequency specified by the CPU 217, and transmits the resultant to the head end 101.

The CableCard 204 (305) is in a form that is attachable to/detachable from the main body of the terminal apparatus 200, as shown in FIG. 5. The connection interface between the main body of the terminal 200 and the CableCard 204 is defined in OpenCable ™ HOST-POD™ Interface Specification (OC-SP-HOSTPOD-IF-I12-030210) and in specifications referred to by this specification. Here, those details are omitted.

The TS decoder 205 performs filtering on the signal accepted from the CableCard 204, and passes necessary data to the audio decoder 206, the video decoder 208, and the CPU 217. Here, the signal sent from the CableCard 204 is an MPEG-2 transport stream. A detailed description of the MPEG-2 transport stream is given in the MPEG specification ISO/IEC 13818-1, and therefore detailed descriptions shall be omitted in the present embodiment. An MPEG2 transport stream is composed of plural fixed-length packets, and a packet ID is assigned to each packet.

This process of extracting only necessary packets according to the packet IDs corresponds to the filtering performed by the TS decoder 205. The TS decoder 205 is capable of performing more than one filtering process simultaneously, at the instruction of the CPU 217.

The audio decoder 206 concatenates audio data embedded in the packets in the MPEG-2 transport stream provided by the TS decoder 205, performs digital-analog conversion on the concatenated data, and outputs the resultant to the speaker 207.

The speaker 207 performs the audio output of the signal provided by the audio decoder 206. The video decoder 208 concatenates video data embedded in the packets in the MPEG-2 transport stream provided by the TS decoder 205, performs digital-analog conversion on the concatenated data, thus generating a video image, and stores the resultant in the video plane 209. Here, the video decoder 208 can reproduce plural videos simultaneously and store the videos in the video plane 209. In addition, the video decoder 208 decodes MPEG-I data provided by the CPU 217, and stores the resultant in the still plane 210.

The video plane 209 is configured of a memory or the like, and stores the video image decoded by the video decoder 208. Here, the video plane 209 has plural storage areas. In the case where the video decoder 208 reproduces plural videos simultaneously, the decoded plural video images are each stored in storage areas within the video plane that correspond to each video image.

The still plane 210 is configured of a memory or the like, and stores an MPEG-I image decoded by the video decoder 208, a still image rendered by the CPU 217, and so on. Images stored in the still plane 210 are primarily used as background images. Here, the still plane 210 has plural storage areas.

The OSD plane 211 is configured of a memory or the like, and stores a graphics image including graphics content rendered by the CPU 217. "Graphics content" refers to basic figures such as points, lines, and quadrangles; characters; and decoded image data as prescribed by the JPEG specifications, PNG specifications, and so on. Here, the OSD plane 211 has plural storage areas.

The display 212 is configured of an image synthesis circuit and a Braun tube, a liquid crystal, or the like. The display 212 synthesizes the images stored in the video plane 209, the still plane 210, and the OSD plane 211, and outputs the resultant.

The secondary storage unit 213, specifically configured of a flash memory or a hard disk and the like, stores and deletes data and programs specified by the CPU 217. Stored data and programs are referred to by the CPU 217. The stored data and programs are kept in storage even when power to the terminal apparatus 200 is cut off.

The primary storage unit 214, specifically configured of RAM or the like, temporarily stores and deletes data and programs specified by the CPU 217. Stored data and programs are referred to by the CPU 217. The stored data and programs are deleted when power to the terminal apparatus 200 is cut off.

The ROM 215 is a read-only memory device. Specifically, the ROM 215 is configured of a Read-Only Memory (ROM), a Compact Disk Read-Only Memory (CD-ROM), a Digital Versatile Disk (DVD), or the like. The ROM 215 stores a program to be executed by the CPU 217.

The input unit 216, specifically configured of a front panel or remote control, accepts an input from the user.

Figure 6:
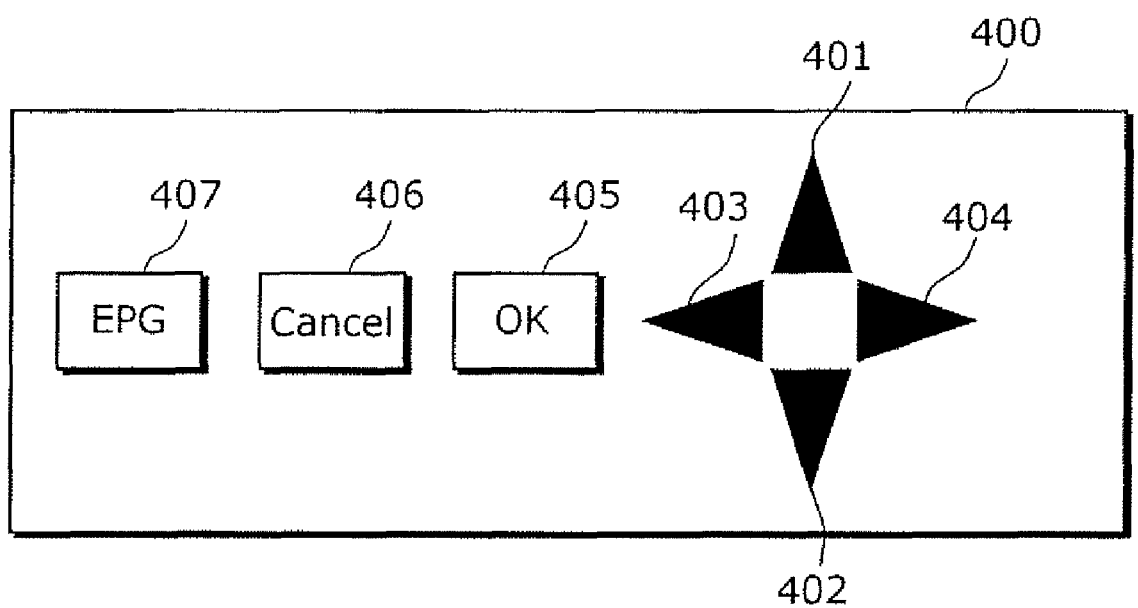
FIG. 6 is a diagram showing an example of the external appearance of a front panel according to the first embodiment of the present invention.

FIG. 6 is diagram showing an example of the input unit 216 configured as a front panel. A front panel 400 corresponds to the front panel unit 303 shown in FIG. 5. The front panel 400 is configured of seven buttons: an up-cursor button 401, a down-cursor button 402, a left-cursor button 403, a right-cursor button 404, an OK button 405, a cancel button 406, and an EPG button 407. When the user presses a button, the CPU 217 is notified of the identifier of the pressed button.

The CPU 217 executes the program stored in the ROM 215. In accordance with instructions from the executed program, the CPU 217 controls the QAM demodulating unit 201, the QPSK demodulating unit 202, the QPSK modulating unit 203, the CableCard 204, the TS decoder 205, the video decoder 208, the display 212, the secondary storage unit 213, the primary storage unit 214, and the ROM 215.

Figure 7:
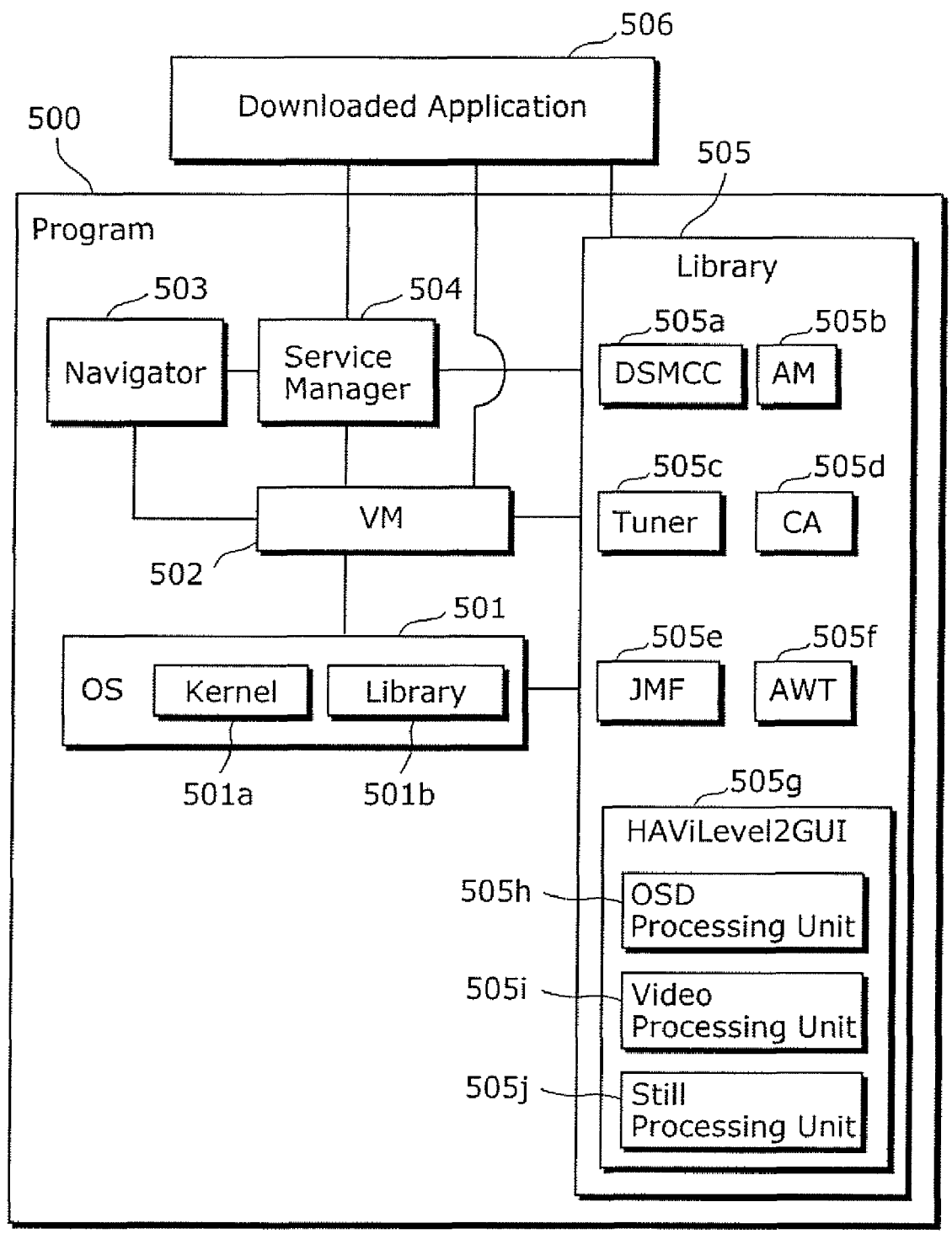
FIG. 7 is a diagram showing a configuration of a program stored in the terminal apparatus according to the first embodiment of the present invention.

FIG. 7 is a conceptual diagram showing the program stored in the ROM 215 and executed by the CPU 217, and the downloaded application program (hereafter, simply "application") stored in the primary storage unit 214 and executed by the CPU 217.

A program 500 is stored in the ROM 215, and is configured of plural subprograms. Specifically, the program 500 is configured of an OS 501, a Java (R) VM 502 ("VM 502", hereafter), a navigator 503, a service manager 504, and a Java library 505 ("library 505", hereafter).

The OS 501 is a subprogram activated by the CPU 217 when power to the terminal apparatus 200 is turned on. The OS 501 stands for an operating system, an example of which is Linux or the like. The OS 501 is a generic name for publicly known technology made up of a kernel 501a for executing a subprogram in parallel with another subprogram and of a library 501b, and to therefore a detailed description is omitted. In the present embodiment, the kernel 501a of the OS 501 executes the VM 502 as a subprogram. Meanwhile, the library 501b provides these subprograms with plural functions required for controlling the constituent elements of the terminal apparatus 200.

A tuning function can be introduced as one example of the functions of the library 501b. With the tuning function, tuning information including a frequency is received from another subprogram and then passed over to the QAM demodulation unit 201. Accordingly, it is possible for the QAM demodulation unit 201 to perform demodulation based on the provided tuning information, and pass the demodulated data to the CableCard 204. As a result, the other subprograms can control the QAM demodulation unit 201 via the library 501b.

The VM 502 is a virtual machine which analyzes and executes programs written in the Java (R) language. Programs written in the Java language are compiled of intermediate code which does not depend on the hardware, called byte-code. The virtual machine is an interpreter which executes this bytecode. Some virtual machines translate the byte codes into an executable form which can be interpreted by the CPU 217 and pass the resultant to the CPU 217, which executes it. The VM 502 is prescribed by the program executed in the kernel 501a, and started. In the present embodiment, the kernel 501a specifies the navigator 503 as the program to be executed. Details of the Java language are explained in many publications, such as "Java Language Specification" (ISBN 0-201-63451-1). Here, those details are omitted. In addition, detailed operations of the VM itself are explained in many publications, such as "Java Virtual Machine Specification" (ISBN 0-201-63451-X). Here, those details are also omitted.

The navigator 503 is a Java program written in the Java language, and is started and sequentially executed by the VM 502. The navigator 503 performs such actions as displaying a channel list to the user, receiving, through the CPU 217, channel selection instructions inputted by the user through the input unit 216, and selecting channels.

The service manager 504 is a Java program written in the Java language which accepts the channel selection instructions from the navigator 503, and is sequentially executed by the VM 502. The service manager 504 selects the TV program of the channel specified by the user. Specifically, the service manager 504 downloads an application that controls the specified TV program, and performs processing up to starting the program. Processing following downloading of the application is carried out central to that application. Here, "downloading" refers to the process for extracting data such as the file system from packets in the MPEG-2 transport stream and storing the extracted data into storage units such as the primary storage unit 214.

Hereafter, a simple description of the procedure in which the service manager 504 downloads an application and starts the application shall be given. The details are of little relation to the present invention, and therefore shall be omitted.

The service manager 504 first requests a Tuner 505c, present in the library 505, to perform tuning. The Tuner 505c refers to channel information stored in the secondary storage unit 213 and obtains tuning information corresponding to the channel selected by the user. Next, the service manager 504 requests a CA 505d present in the library 505 to perform descrambling. The CA 505d provides the CableCard 204 with information required for descrambling through the library 501b in the OS 501. On the basis of such provided information, the CableCard 204 descrambles the signal provided by the QAM demodulation unit 201, and passes the resultant signal to the TS decoder 205. Next, the service manager 504 requests the AM 505b, which is present in the library 505, to execute the application provided by the specified channel. The AM 505b fetches an Application Information Table (AIT) included in the channel, and fetches information concerning the application included in the channel. The AIT is prescribed in the DVB-MHP specifications. In accordance with the fetched information concerning the application, the AM 505b requests a DSMCC 505a located within the library 505 to download a file system made up of directories and files held by the specified channel. The DSMCC format, as denoted in the MPEG specification ISO/IEC 13818-6, is used as a method for embedding data such as the file system into, and fetching such data from, the MPEG-2 transport stream. The AM 505b executes the application to be executed from the information contained in the file system downloaded to the primary storage unit 214. In FIG. 7, the selected application is indicated as the downloaded application 506.

The library 505 is a collection of plural Java libraries stored in the ROM 215. The library 505 provides a Java API for applications so that the applications can utilize the functions of the terminal apparatus 200. In the present embodiment, the library 505 includes the DSMCC 505a, the AM 505b, the Tuner 505c, a CA 505d, a JMF 505e, an AWT 505f, and a HAVi Level 2 GUI 505g. Note that the HAVi Level 2 GUI 505g includes an OSD processing unit 505h, a video processing unit 505i, and a still processing unit 505j.

The DSMCC 505a provides a function for controlling the TS decoder 205 via the library 501b, fetching a file system multiplexed within the MPEG-2 transport stream in the DSMCC object carousel format, and storing the file system in the primary storage unit 214. The DSMCC object carousel format is prescribed in the MPEG specifications ISO/IEC 13818-6, and therefore detailed descriptions shall be omitted here.

The AM 505b controls the TS decoder 205 via the library 501b, fetching the Application Information Table (AIT) multiplexed within the MPEG-2 transport stream, and fetching the information concerning the application included in the channel. The AIT is prescribed in the DVB-MHP specifications. In accordance with the fetched information concerning the application, the AM 505b requests the DSMCC 505a, which is within the library 505, to download the file system, made up of directories and files, that the specified channel holds. The AM 505b starts the application specified by the AIT to be executed from the file system downloaded to the primary storage unit 214.

The Tuner 505c controls the QAM demodulation unit 201 via the library 501b, providing the function for tuning to the specified frequency.

By providing the CableCard 204 with information necessary for decoding via the library 501b of the OS 501, the CA 505d provides a function with which the CableCard 204 can descramble a scrambled MPEG-2 transport stream.

The JMF 505e controls the TS decoder 205, the audio decoder 206, and the video decoder 208 via the library 501b, reproducing the audio and video.

The AWT 505f provides a Java API through which the application performs rendering and which is used in accepting a key input notification from the input unit 216. The AWT 505f provides an API for rendering basic figures such as lines, points, and quadrangles, an API for decoding images in the Joint Photographic Experts Group (JPEG) format or the Joint Photographic Experts Group (PNG) format and expanding those images in the OSD plane 211. Specifically, the AWF 505f is equivalent to the java.awt package, java.awt.event package, and other java.awt subpackages, as prescribed in The Java (R) Class Libraries, Second Edition, Volume 2 (ISBN 0-201-31003-1). Here, those details are omitted.

The HAVi Level 2 GUI 505g provides an API so that the application can control the video plane 209, the still plane 210, and the OSD plane 211, and is configured of an OSD processing unit 505h, a video processing unit 505i, and a still processing unit 505j. Specifically, each of these processing units are equivalent to the org.havi.ui package and the org.havi.ui.event package prescribed in the DVB-MHP specifications. Here, functions related to the present invention shall be described.

The OSD processing unit 505h provides an API for controlling the OSD plane 211. Specifically, the OSD processing unit 505h is configured of the org.havi.ui package HGraphicsDevice and related classes.

The video processing unit 505i provides an API for controlling the video plane 209. Specifically, the video processing unit 505i is configured of the org.havi.ui package HVideoDevice and related classes.

The still processing unit 505j provides an API for controlling the still plane 210. Specifically, the still processing unit 505j is configured of the org.havi.ui package HBackgroundDevice and related classes.

The downloaded application 506 is a Java program written in the Java language, and is sequentially executed by the VM 502. The application 506 includes display processing denotations for expressing a TV program in the terminal apparatus 200. Specifically, denotations such as the following are included: graphics content display processing using the AWT 505f and the OSD processing unit 505h; video content display processing using the JMF 505e and the video processing unit 505i; and background image display processing using the still processing unit 505j.

Hereafter, descriptions shall be given regarding a display function, which is the primary function of the present invention.

Figure 8:
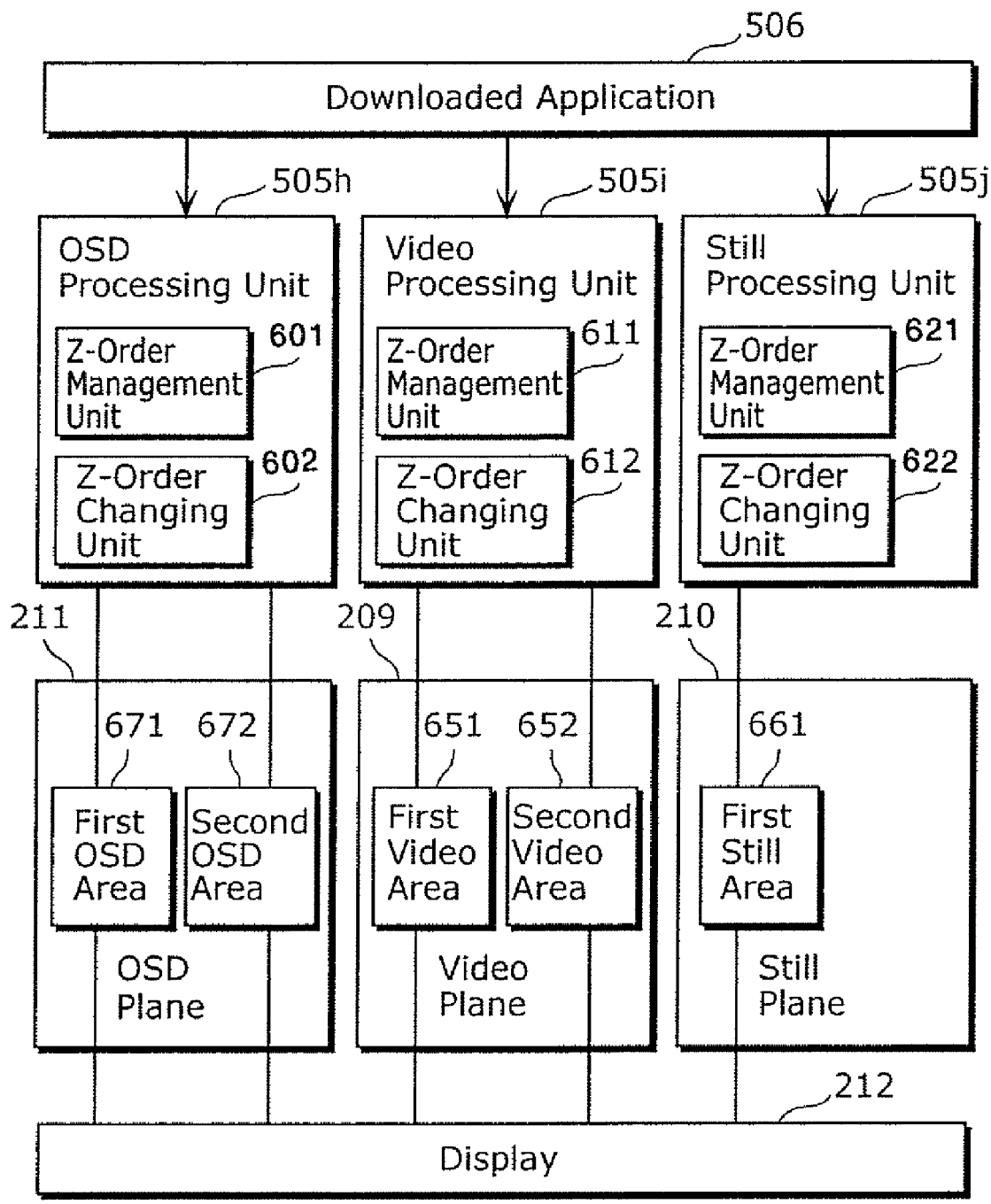
FIG. 8 is a schematic diagram showing a configuration of a display processing device and a downloaded program according to the first embodiment of the present invention.

FIG. 8 is a conceptual diagram showing a relationship between hardware components and software components related to the display function in the terminal apparatus 200. In FIG. 8, components given the same numbers as in FIGS. 4 and 7 represent the same components as shown in FIGS. 4 and 7. Here, the OSD processing unit 505h includes a Z-order management unit 601 and a Z-order changing unit 602; the video processing unit 505*i* includes a Z-order management unit 611 and a Z-order changing unit 612; and the still processing unit 505*j* includes a Z-order management unit 621 and a Z-order changing unit 622. Furthermore, the video plane 209 has two areas, which are a first video area 651 and a second video area 652; the still plane 210 has one area, which is a first still area 661; and the OSD plane 211 has two areas, which are a first OSD area 671 and a second OSD area 672. Here, the OSD processing unit 505*h*, video processing unit 505*i* and still processing unit 505*j* are configured as software, but the present invention can be realized even with these three units configured as hardware. In addition, the video plane 209 is described as having two areas, the still plane 210 as having one area, and the OSD plane 211 as having two areas; however, this is only one example, and the present invention can still be realized even if more or less areas are included.

The display processing that the application 506 performs involves generating an image to be displayed in the first video area 651 and second video area 652 of the video plane 209, the first still area 661 of the still plane 210, and the first OSD area 671 and second OSD area 672 of the OSD plane 211; the display 212 synthesizes the images generated in these areas and displays the synthesized image.

Figure 9:
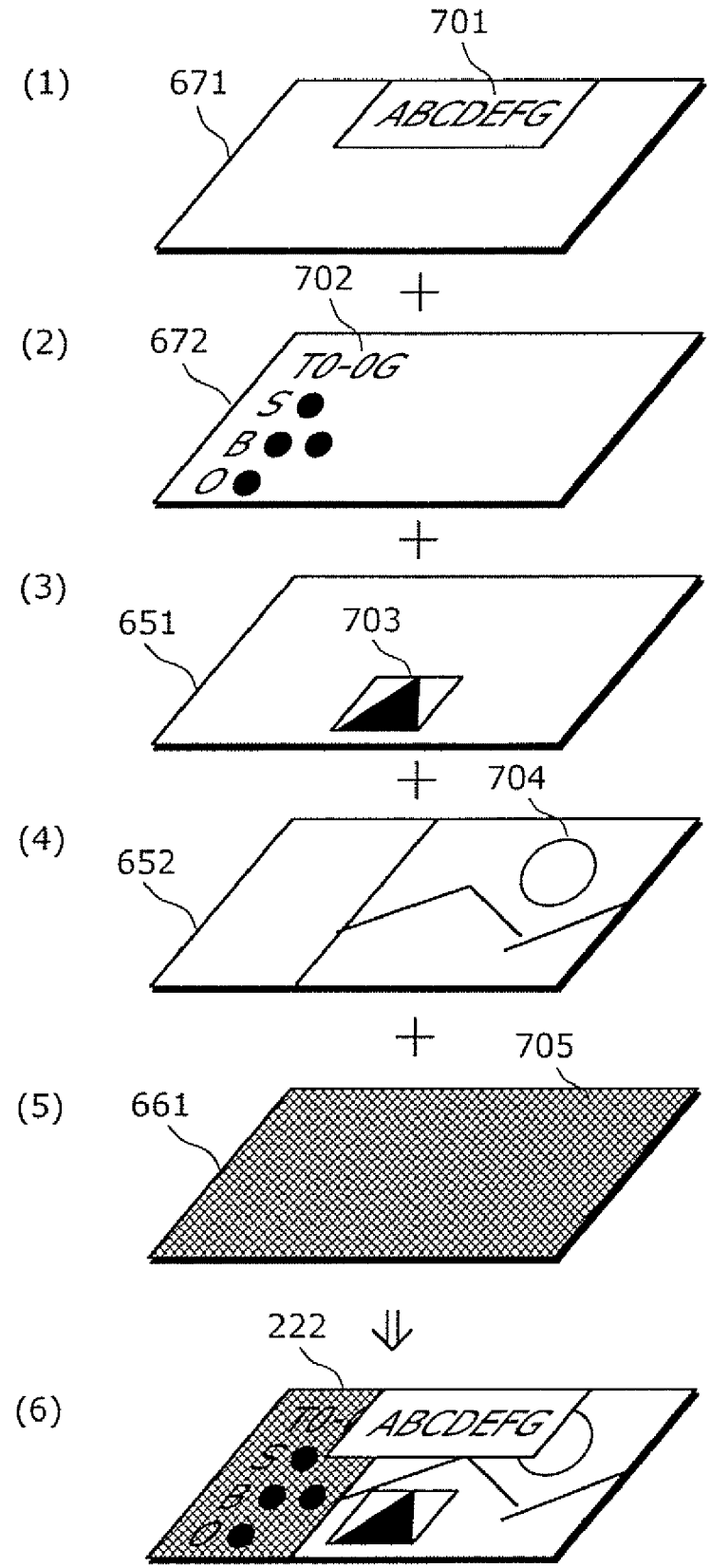
FIG. 9 is a diagram showing plural images being synthesized by the display processing device according to the first embodiment of the present invention.

FIG. 9 is a conceptual diagram showing an example of the display 212 synthesizing the images in the 5 planes and outputting the synthesized images. As shown in FIG. 9 (1), an image including graphics content 701 is stored in the first OSD area 671. The graphics content 701 is character information, and is information rendered by a character broadcast application 506 so as to scroll from right to left, As shown in FIG. 9 (2), an image including graphics content 702 is stored in the second OSD area 672. The graphics content 702 is character information, and shows the current information of a baseball game. This display is updated by the application 506 as the baseball game progresses. As shown in FIG. 9 (3), an image including video content 703 is stored in the first video area 651. The video content 703 is formed of a superimposed child screen, and displays the video of a certain channel at a reduced size to the bottom-left of video content 704, which will be mentioned later. For the video content 703, the display position, display size, and channel of the video to be reproduced are determined by the application 506. As shown in FIG. 9 (4), an image including video content 704 is stored in the second video area 652. Video content 704 is formed of a superimposed main screen, uses approximately ⅔ of the right side of the screen, and displays the video of a certain channel. For the video content 704, the display position, display size, and channel of the video to be reproduced are determined by the application 506. As shown in FIG. 9 (5), an image including still content 705 is stored in the first still area 661. Here, the still content 705 is a single-color fill that covers the entirety of the screen. In the images in each area shown in FIG. 9 (1) through (5), parts in which graphics content, video content, and still content are not placed are transparent. The display 212 superimposes the images shown in FIG. 9 (1) through (5) in order from the bottom, or in other words, the first still area 661, second video area 652, first video area 651, second OSD area 672, first OSD area 671, and creates a synthesized image. In other words, the first still area 661, second video area 652, first video area 651, second OSD area 672, and first OSD area 671 have a vertical positional order, and the display 212 understands this vertical order. Here, "superimposing" refers to writing the top image onto the bottom image. Note that a lower image will appear in the transparent area of an upper image. As shown in FIG. 9 (6), the display 212 indicates a synthesized image in which the images indicated by FIG. 9 (1) through (5) have been synthesized.

The application 506 can thus implement an effective display by synthesizing a plurality of images in this manner. For example, the graphics content 701 indicated by FIG. 9 (1) and the graphics content indicated by FIG. 9 (2) are superimposed. Conventionally, the application 506 would attempt to render the superimposed graphics content 701 and 702 in the same area of the OSD plane. In such a case, the application 506 must perform rendering while taking into consideration the overlap of the graphics content 701 and 702. This causes the rendering processing to slow down; for example, the character broadcast of the graphics content 701 will scroll at a slower speed. However, as mentioned above, in the present embodiment, faster rendering processing can be realized by the application 506 rendering the two graphics contents in separate OSD areas and the display 212 performing synthesis processing. In addition, the complexity of the application 506 can be reduced, as can the work required in developing the application 506.

Furthermore, the same effect can obtained for the video contents 703 and 704 indicated by FIGS. 9 (3) and (4). The video is reproduced by the video decoder 208. For example, conventionally, two videos are reproduced simultaneously and in parallel, and the two video contents are superimposed and stored in the same area of the video plane. In such a case, the video encoder 208 must perform exclusion processing for the superimposed parts. As a result, the decoding processing slows down, and there is the possibility that the video cannot be reproduced with smooth movement. However, as mentioned above, in the present embodiment, faster video rendering processing can be realized by the video decoder 208 storing the two video contents in separate video areas and the display 212 performing synthesis processing.

Here, the functions of the OSD processing unit 505*h*, video processing unit 505*i*, and still processing unit 505*j*, which are used to implement synthesis of the images indicated in FIG. 9, shall be described. In the DVB-MHP specifications, each area in the planes is expressed as an instance of a class. One area of the OSD plane 211 is expressed as an instance of the HGraphicsDevice class; one area of the video plane 209 is expressed as an instance of the HVideoDevice class; and one area of the still plane 210 is expressed as an instance of the HBackgroundDevice class. The application 506 can acquire these instances from methods provided by the HScreen class. The getHGraphicsDevices method stores, in an array, the same number of instances of the HGraphics Device as there are areas held by the OSD plane 211, and returns this array; the getHVideoDevices method stores, in an array, the same number of instances of the HVideoDevice as there are areas held by the video plane 209, and returns this array; and the getHBackgroundDevices method stores, in an array, the same number of instances of the HBackgroundDevice as there are areas held by the still plane 210, and returns this array. In the present invention, the Z-order management unit 601 of the OSD processing unit 505*h* stores HGraphicsDevice instances in the array returned by the getHGraphicsDevices method in accordance with the vertical order. Here, the HGraphicsDevice instances corresponding to OSD areas are stored in the array in order from the OSD area located higher in the vertical order. In the case where the terminal apparatus 200 is configured as shown in FIGS. 8 and 9, the Z-order management unit 601 of the OSD processing unit 505*h* stores the HGraphicsDevice instance of the first OSD area 671, which is positioned higher in the vertical order, in the first element of the array, and stores the HGraphicsDevice instance of the second OSD area 672, which is positioned lower in the vertical order, in the second element of the array. Similarly, the Z-order management unit 611 of the video processing unit 505i also stores the HVideoDevice instances in the array returned by the getHVideoDevices method in accordance with the vertical order Also, the Z-order management unit 621 of the still processing unit 505j stores the HBackgroundDevice instances in the array returned by the getHBackgroundDevices method in accordance with the vertical order. However, in FIG. 8, the still plane 210 has only one area. Therefore, the Z-order management unit 621 of the still processing unit 505j simply stores the HBackgroundDevice instance corresponding to the first still area 661 in the array.

In short, the roles of the Z-order management unit 601, Z-order management unit 611, and Z-order management unit 621 are as follows: the Z-order management unit 601, Z-order management unit 611, and Z-order management unit 621 each manage a set of the areas held by the OSD plane 211, video plane 209, and still plane 210, the vertical order thereof, and the instance corresponding to each area, as a management table. When the getHGraphicsDevice method, getHVideoDevice method, and getHBackgroundDevice method are called, the Z-order management unit 601, Z-order management unit 611, and Z-order management unit 621 store the HGraphicsDevice instance, HVideoDevice instance, and HBackgroundDevice instance in the array based on the vertical order information within the management table, and return the array.

FIGS. 10A, 10B, and 10C are diagrams showing examples of the management tables respectively managed by the Z-order management unit 601, Z-order management unit 611, and Z-order management unit 621.

FIG. 10A shows an example of the management table managed by the Z-order management unit 601 of the OSD processing unit 505h. Column 801 holds an address for an area of the OSD plane 211. Column 802 holds information indicating the vertical order of the area indicated in column 801. Here, numbers are stored in column 802, with the numbers being assigned in order from the top of the vertical order, such as "1", "2", and so on, Note that this vertical order refers to the vertical order within the OSD plane 211. The vertical order of the OSD plane 211, video plane 209, and still plane 210 is fixed, with the OSD plane 211 at the top, the video plane 209 next, followed by the still plane 210. Column 803 stores the HGraphicsDevice instance which corresponds to the area indicated in column 801. This instance is generated and held when the terminal apparatus 200 is turned on. Information corresponding to the first OSD area 671 of the OSD plane 211 is stored in row 811; information indicating that the first OSD area 671 is highest in the vertical order and a corresponding "HGraphicsDeviceA" instance are stored in this row. Here, the letter "A" is simply a letter attached to identify the instance, and has no particular meaning. Information corresponding to the second OSD area 672 of the OSD plane 211 is stored in row 812; information indicating that the second OSD area 672 is second-highest in the vertical order and a corresponding "HGraphicsDeviceB" instance are stored in this row. As before, the letter "B" is simply a letter attached to identify the instance, and has no particular meaning.

FIG. 10B shows an example of the management table managed by the Z-order management unit 611 of the OSD processing unit 505i. Column 821 holds an address for an area of the OSD plane 209. Column 822 holds information indicating the vertical order of the area indicated in column 821. Here, numbers are stored in column 822, with the numbers being assigned in order from the top of the vertical order, such as "1", "2", and so on. Note that this vertical order refers to the vertical order within the OSD plane 209. Column 823 stores the HVideoDevice instance which corresponds to the area indicated in column 821. This instance is generated and held when the terminal apparatus 200 is turned on. Information corresponding to the first video area 651 of the video plane 209 is stored in row 831; information indicating that the first video area 651 is highest in the vertical order and a corresponding "HVideoDeviceA" instance are stored in this row. Here, the letter "A" is simply a letter attached to identify the instance, and has no particular meaning. Information corresponding to the second video area 652 of the video plane 209 is stored in row 832; information indicating that the second video area 652 is second-highest in the vertical order and a corresponding "HVideoDeviceB" instance are stored in this row. Again, the letter "B" is simply a letter attached to identify the instance, and has no particular meaning.

FIG. 10C shows an example of the management table managed by the Z-order management unit 621 of the still processing unit 505j. Column 841 holds an address for an area of the still plane 210. Column 842 holds information indicating the vertical order of the area indicated in column 841. Here, numbers are stored in column 842, with the numbers being assigned in order from the top of the vertical order, such as "1", "2", and so on. Note that this vertical order refers to the vertical order within the still plane 210. Column 843 stores the HBackgroundDevice instance which corresponds to the area indicated in column 841. This instance is generated and held when the terminal apparatus 200 is turned on. Information corresponding to the first still area 661 of the still plane 210 is stored in row 851; information indicating that the first still area 661 is highest in the vertical order and a corresponding "HBackgroundDeviceA" instance are stored in this row. As before, the letter "A" is simply a letter attached to identify the instance, and has no particular meaning.

Figure 11:
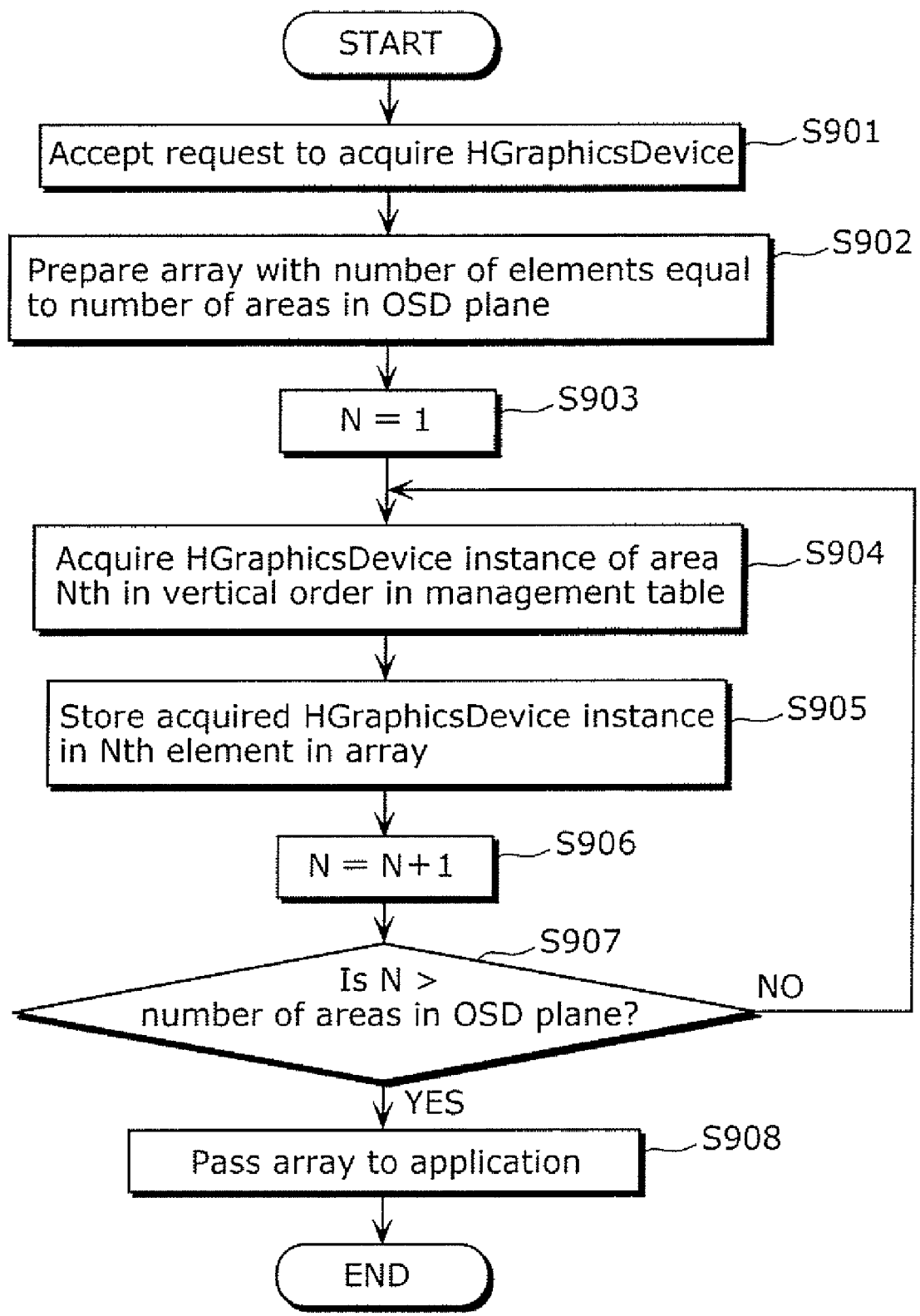
FIG. 11 is a flowchart showing an operation of a Z order management unit according to the first embodiment of the present invention.

FIG. 11 is a flowchart showing an operation of the Z-order management unit 601 of the OSD processing unit 505h. As shown in FIG. 11, when the application 506 calls the getHGraphicsDevice method, the Z-order management unit 601 accepts a request to acquire the HGraphicsDevice instance (Step S901). The Z-order management unit 601 prepares an array with a number of elements equal to the number of areas included in the OSD plane 211 (Step S902). When the terminal apparatus 200 is configured as shown in FIG. 8, the Z-order management unit 601 prepares an array with "2" array elements. In the case where the Java language is used, the Z-order management unit 601 writes "HGraphicsDevice[ ]array=newHGraphicsDevice[2]". Next, the Z-order management unit 601 sets a variable N to an initial value of "1" (Step S903). Referring to the management table, the Z-order management unit 601 searches for the area Nth in vertical order, and acquires the corresponding HGraphicsDevice instance (Step S904). For example, when the management table is configured as shown in FIG. 10A, if N=1, the first OSD area 671 in row 811 is first in the vertical order, and therefore the corresponding "HGraphicsDeviceA" is acquired. Next, the Z-order management unit 601 stores the acquired HGraphicsDevice instance in the Nth array element (Step S905). When the acquired instance is "HGraphicsDeviceA", and N=1, "HGraphicsDeviceA" is stored in the first array element. In the case where the Java language is used, the Z-order management unit 601 writes "array[0]=HGraphicsDevice_A". Here, the array element number is "0" because the array script starts at "0". HGraphicsDevice_A is a variable that indicates "HGraphicsDeviceA". Next, the Z-order management unit 601 adds 1 to the variable N (Step S906). When the value of the variable N is less than or equal to the number of areas in the OSD plane 211 (NO of Step S907), the Z-order management unit 601 repeats the processing from Step S904. When the value of the variable N is greater than the number of areas in the OSD plane 211 (YES of Step S907), the Z-order management unit 601 returns the array to the application 506 (Step S908). For example, when the management table is configured as shown in FIG. 10A an array with a length of 2, in which "HGraphicsDeviceA" is stored in the first array element and "HGraphicsDeviceB" is stored in the second array element, is returned.

Figure 12:
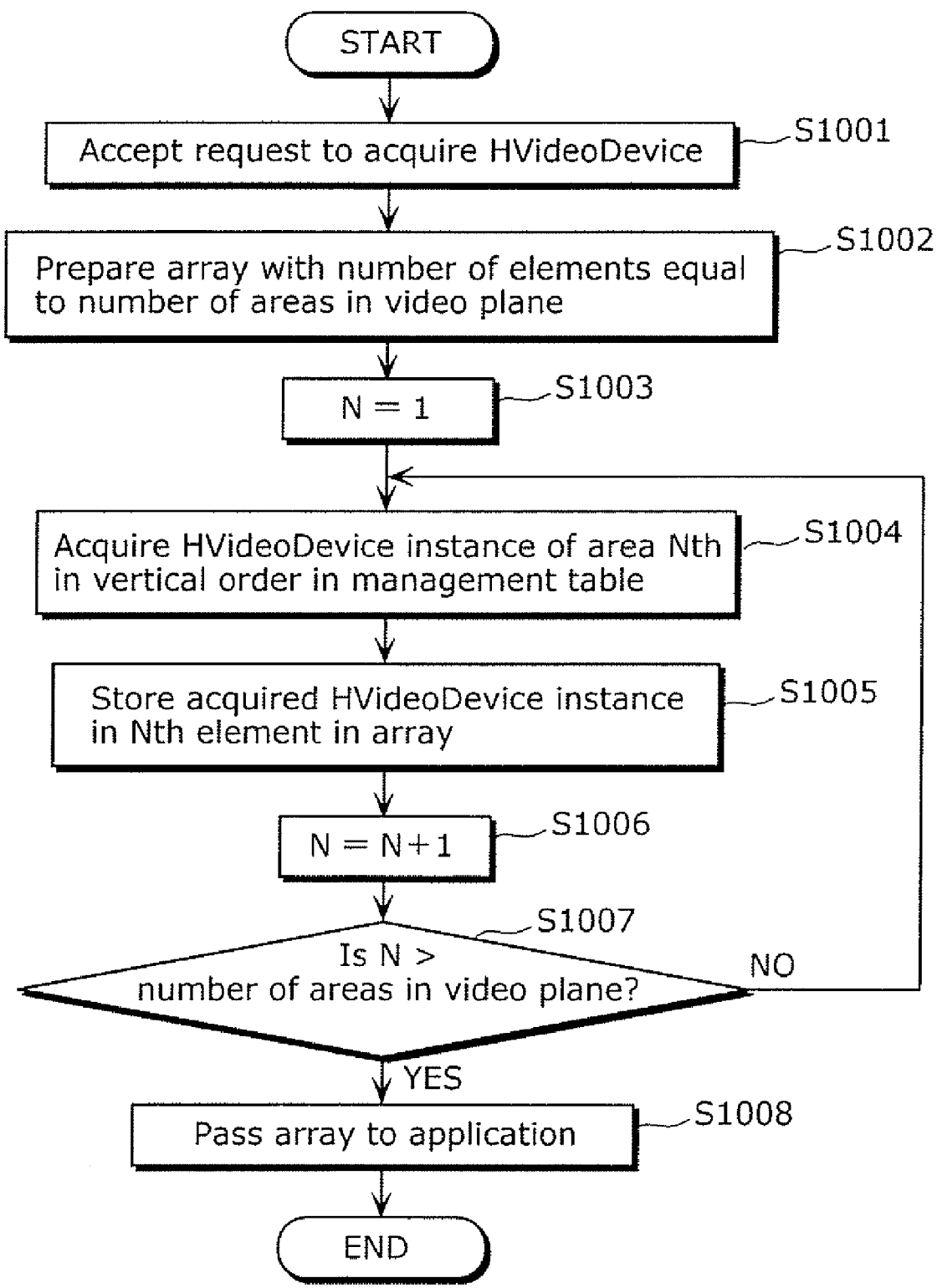
FIG. 12 is a flowchart showing an operation of another Z order management unit according to the first embodiment of the present invention.

FIG. 12 is a flowchart showing an operation of the Z-order management unit 611 of the video processing unit 505i. As shown in FIG. 12, when the application 506 calls the getHVideoDevice method, the Z-order management unit 611 accepts a request to acquire the HVideoDevice instance (Step S1001). The Z-order management unit 611 prepares an array with a number of elements equal to the number of areas included in the video plane 209 (Step S1002). When the terminal apparatus 200 is configured as shown in FIG. 8, the Z-order management unit 611 prepares an array with "2" array elements. In the case where the Java language is used, the Z-order management unit 611 writes "HVideoDevice[ ]array=newHVideoDevice[2]". Next, the Z-order management unit 611 sets a variable N to an initial value of "1" (Step S1003). Referring to the management table, the Z-order management unit 611 searches for the Nth area in vertical order, and acquires the corresponding HVideoDevice instance (Step S1004). For example, when the management table is configured as shown in FIG. 10B, if N=1, the first video area 651 in row 831 is first in the vertical order, and therefore the corresponding "HVideoDeviceA" is acquired. Next, the Z-order management unit 611 stores the acquired HVideoDevice instance in the Nth array element (Step S1005). When the acquired instance is "HVideoDeviceA", and N=1, "HVideoDeviceA" is stored in the first array element. In the case of using the Java language, the Z-order management unit 611 writes "array[0]=HVideoDevice_A". Here, the array element number is "0" because the array script starts at "0". HVideoDevice_A is a variable that indicates "HVideoDeviceA". Next, the Z-order management unit 611 adds 1 to the variable N (Step S1006). When the value of the variable N is less than or equal to the number of areas in the video plane 209 (NO of Step S1007), the Z-order management unit 611 repeats the processing from Step S1004. When the value of the variable N is greater than the number of areas in the video plane 209 (YES of Step S1007), the Z-order management unit 611 returns the array to the application 506 (Step S1008). For example, when the management table is configured as shown in FIG. 10B, an array with a length of 2, in which "HVideoDeviceA" is stored in the first array element and "HVideoDeviceB" is stored in the second array element, is returned.

Figure 13:
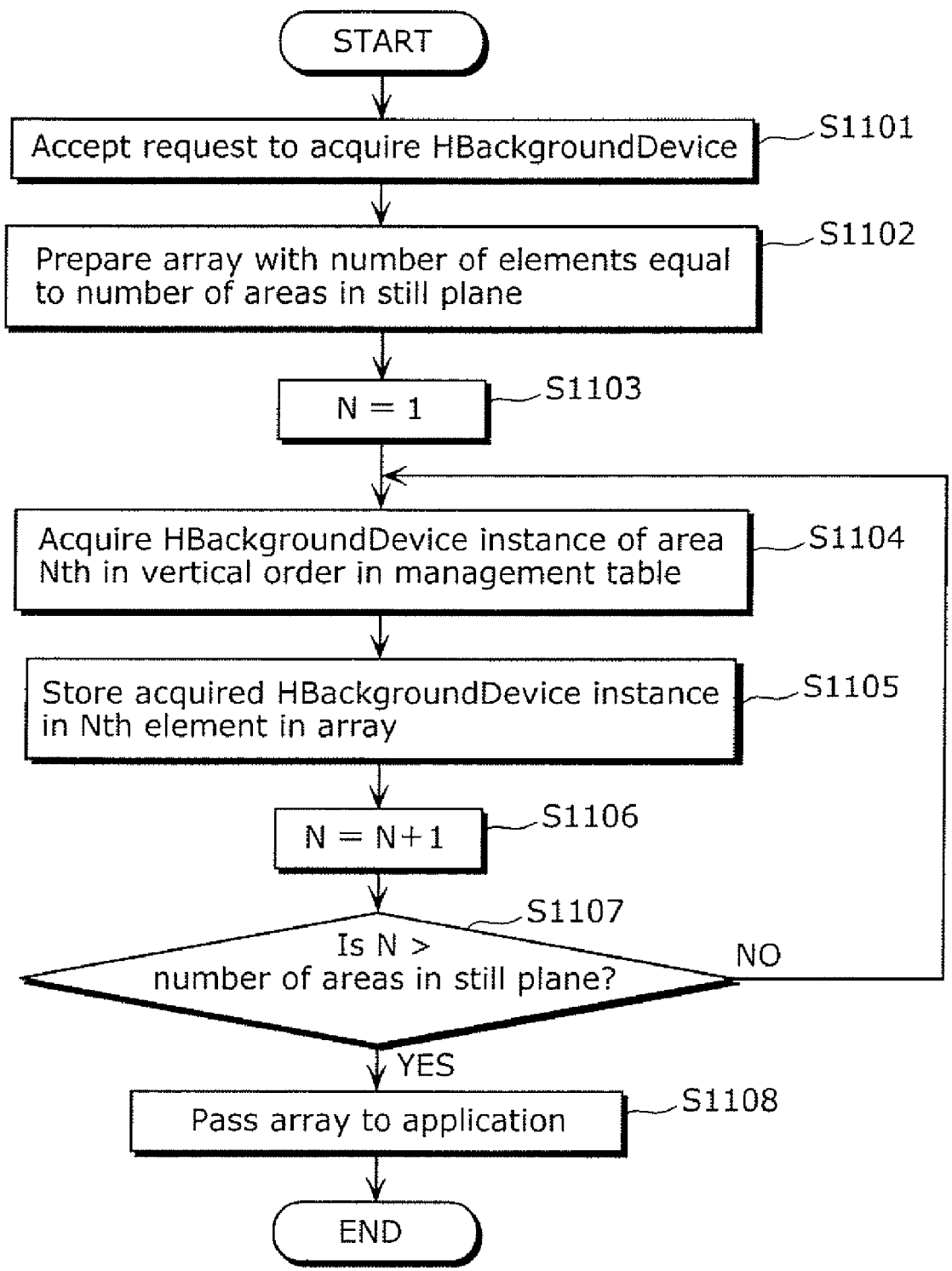
FIG. 13 is a flowchart showing an operation of yet another Z order management unit according to the first embodiment of the present invention.

FIG. 13 is a flowchart showing an operation of the Z-order management unit 621 of the still processing unit 505j. As shown in FIG. 13, when the application 506 calls the getHBackgroundDevice method, the Z-order management unit 621 accepts a request to acquire the HBackgroundDevice instance (Step S1101). The Z-order management unit 621 prepares an array with a number of elements equal to the number of areas included in the still plane 210 (Step S1102). When the terminal apparatus 200 is configured as shown in FIG. 8, the Z-order management unit 621 prepares an array with "1" array element. In the case where the Java language is used, the Z-order management unit 621 writes "HBackgroundDevice[ ]array=newHBackgroundDevice[1]". Next, the Z-order management unit 621 sets a variable N to an initial value of "1" (Step S1103). Referring to the management table, the Z-order management unit 621 searches for the Nth area in vertical order, and acquires the corresponding HBackgroundDevice instance (Step S1104). For example, when the management table is configured as shown in FIG. 10C, if N=1, the first still area 661 in row 851 is first in the vertical order, and therefore the corresponding "HBackgroundDeviceA" is acquired. Next, the Z-order management unit 621 stores the acquired HBackgroundDevice instance in the Nth array element (Step S1105). When the acquired instance is "HBackgroundDeviceA", and N=1 "HBackgroundDeviceA" is stored in the first array element. In the case of using the Java language, the Z-order management unit 621 writes "array[0]=HBackgroundDevice_A". Here, the array element number is "0" because the array script starts at "0". HBackgroundDevice_A is a variable that indicates "HBackgroundDeviceA". Next, the Z-order management unit 621 adds 1 to the variable N (Step S1106). When the value of the variable N is less than or equal to the number of areas in the still plane 210 (NO of Step S1107), the Z-order management unit 621 repeats the processing from Step S1104. When the value of the variable N is greater than the number of areas in the still plane 210 (YES of Step S1107), the Z-order management unit 621 returns the array to the application 506 (Step S1108). For example, when the management table is configured as shown in FIG. 10C, an array with a length of 1, in which "HBackgroundDeviceA" is stored in the array element, is returned.

The storage sequence for the elements of the array returned by the getHGraphicsDevices method corresponds to the vertical order of the areas in the OSD plane 211; the storage sequence for the elements of the array returned by the getHVideoDevices method corresponds to the vertical order of the areas in the video plane 209; and the storage sequence for the elements of the array returned by the getHBackgroundDevices method corresponds to the vertical order of the areas in the OSD plane 210. Therefore, the application 506 can obtain the HGraphicsDevice instance, the HVideoDevice instance, and the HBackgroundDevice instance corresponding to the layers appropriate for use in displaying. Hereafter, a process through which the application 506 performs rendering processing based on these obtained instances shall be briefly described.

When rendering into the OSD plane 211, the application 506 acquires an HScene instance by passing the HGraphicsDevice instance as an argument to the HSceneFactory class getFullScreenScene method prescribed in the org.havi.ui package. The HScene instance obtained at this time is a base window created in an area of the OSD plane 211 that corresponds to the HGraphicsDevice instance provided by the argument. The HScene instance is an instance of the HScene class, which is a successor to the java.awt package Container class; the application 506 can perform rendering using the function of the AWT 505f, which is in the library 505. The function of the AWT 505f is equivalent to the functions of the java.awt package and subpackages thereof; this rendering function is publicly-known technology, and thus descriptions shall be omitted. Here, an example of this rendering shall be introduced.

Figures 14, 15:
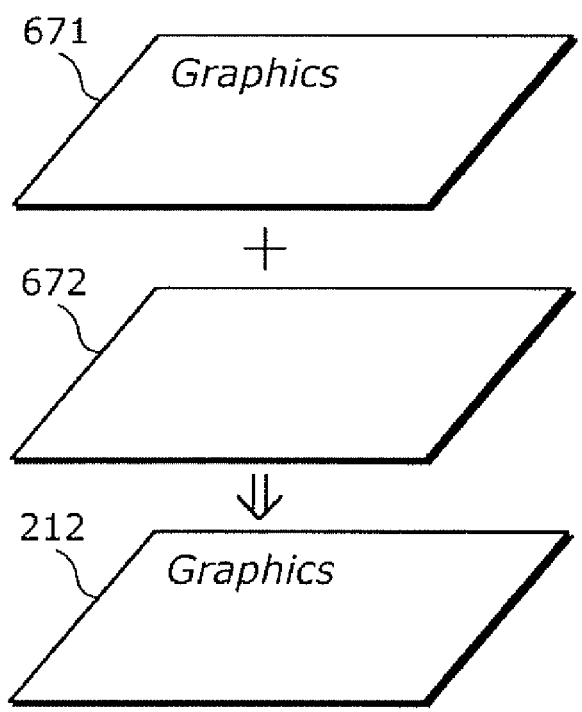
FIG. 14 is a diagram showing an example of application code according to the first embodiment of the present invention.
FIG. 15 is a diagram showing rendering as carried out by the application according to the first embodiment of the present invention.

FIG. 14 is a diagram showing an example of program code of the application 506. Here, the terminal apparatus is configured as shown in FIG. 8, and the management table is configured as shown in FIG. 10A. In lines 1 and 2 of FIG. 14, the application 506 obtains an array device that stores the two HGraphicsDevice instances. The application 506 acquires the HSceneFactory class instance in line 3 of FIG. 14; after that, in line 4 of FIG. 14, the application 506 uses the HGraphicsDevice instance stored in the variable device[0] and obtains the HScene instance that corresponds to the first OSD area 671 of the OSD plane 211, which is located higher in the vertical order. Next, in line 5 of FIG. 14, the application 506 completes preparation for rendering by acquiring the Graphics instance from the HScene instance, and in line 6 of FIG. 14, sets the color. Here, the application 506 sets the color to black. In addition, in line 7 of FIG. 14, the application 506 writes the character string "Graphics" at coordinates (30, 30) of the first OSD area 671.

Furthermore, in line 9 of FIG. 14, the application 506 uses the HGraphicsDevice instance stored in the variable device [1] and obtains the HScene instance that corresponds to the second OSD area 672 of the OSD plane 211, which is located lower in the vertical order. In line 10 of FIG. 14, the application 506 completes preparation for rendering by acquiring the Graphics instance from the HScene instance, and in line 11 of FIG. 14, sets the color Here, the application 506 sets the color to white. In addition, in line 12 of FIG. 14, the application renders a rectangle filled with white in the second OSD area 672.

FIG. 15 is a diagram showing the results of the rendering performed by the application indicated in FIG. 14. As shown in FIG. 15 (1), the character string "Graphics" is rendered at coordinates (30, 30) in the first OSD area 671. As shown in FIG. 15 (2), the second OSD area 672 is filled with white. As shown in FIG. 15 (3), the display 212 shows the result of synthesis. As the second OSD area 672 is filled with white, details shown in the video plane 209 and still plane 210 below are hidden. In this result of synthesis, the image in the second OS area 672 is overwritten by the image in the first OSD area 671.

When reproducing video (rendering video) in the video plane 209, the application 506 calls the getVideoController method, which is prepared by the HVideoDevice instance, and acquires the Player instance. The Player instance provides a function for reproducing video and sound provided by the JMF 505e of the library 505. By calling various methods prepared by the Player instance, the application 506 can specify the video and audio to be reproduced, the position the reproduced video is displayed on the screen, and the size the video is displayed at. The functions provided by the JMF 505e are publicly-known technology, and thus detailed descriptions shall be omitted. A method in which the application 506 obtains the Player instances corresponding to each area of the video plane 209 shall be introduced here.

FIG. 16 is a diagram showing an example of program code of the application 506. Here, the terminal apparatus is configured as shown in FIG. 8, and the management table is configured as shown in FIG. 10B. In lines 1 and 2 of FIG. 16, the application 506 obtains an array device that stores the two HVideoDevice instances. In line 3 of FIG. 16, the application 506 calls the getVideoController method of the HVideoDevice instance stored in the variable device[0], thereby obtaining the Player instance corresponding to the first video area 651 of the video plane 209, which is positioned higher in the vertical order. In addition, in line 5 of FIG. 16, the application 506 calls the getVideoController method of the HVideoDevice instance stored in the variable device[1], thereby obtaining the Player instance corresponding to the second video area 652 of the video plane 209, which is positioned lower in the vertical order.

When rendering in the still plane 210, the application 506 calls the method prepared by the HBackgroundDevice instance, and obtains the HBackgroundConfiguration instance. The HBackgroundConfiguration instance provides a set color method for filling an area in the still plane 210 with a single color.

FIG. 17 is a diagram showing an example of program code of an application 506. Here, the terminal apparatus is configured as shown in FIG. 8, and the management table is configured as shown in FIG. 10C. In lines 1 and 2 of FIG. 17, the application 506 obtains an array device that stores the one HBackgroundDevice instance. In lines 3 and 4 of FIG. 17, the application 506 calls the getCurrentConfiguration method of the HBackgroundDevice instance stored in the variable device[0], and obtains the HBackgroundConfiguration instance. In addition, in line 5 of FIG. 17, the application 506 calls the setcolor method of the HBackgroundInstance. Here, by passing "blue" in the argument, the application 506 fills the first still area 661 of the still plane 210 with blue.

On the other hand, the Z-order changing unit 602 provides a function for changing the vertical order of the areas managed by the Z-order management unit 601, the Z-order changing unit 612 provides a function for changing the vertical order of the areas managed by the Z-order management unit 611, and the Z-order changing unit 622 provides a function for changing the vertical order of the areas managed by the Z-order management unit 621. For example, the Z-order changing unit 602 of the OSD processing unit 505h provides a setHGraphicsDeviceZOrder method to the HScreen class. This method receives an HGraphicsDevice instance as a first argument, and receives a numerical value indicating the vertical position as a second argument. The numerical value ranges from 1 to the number of areas in the OSD plane 211.

Figure 18:
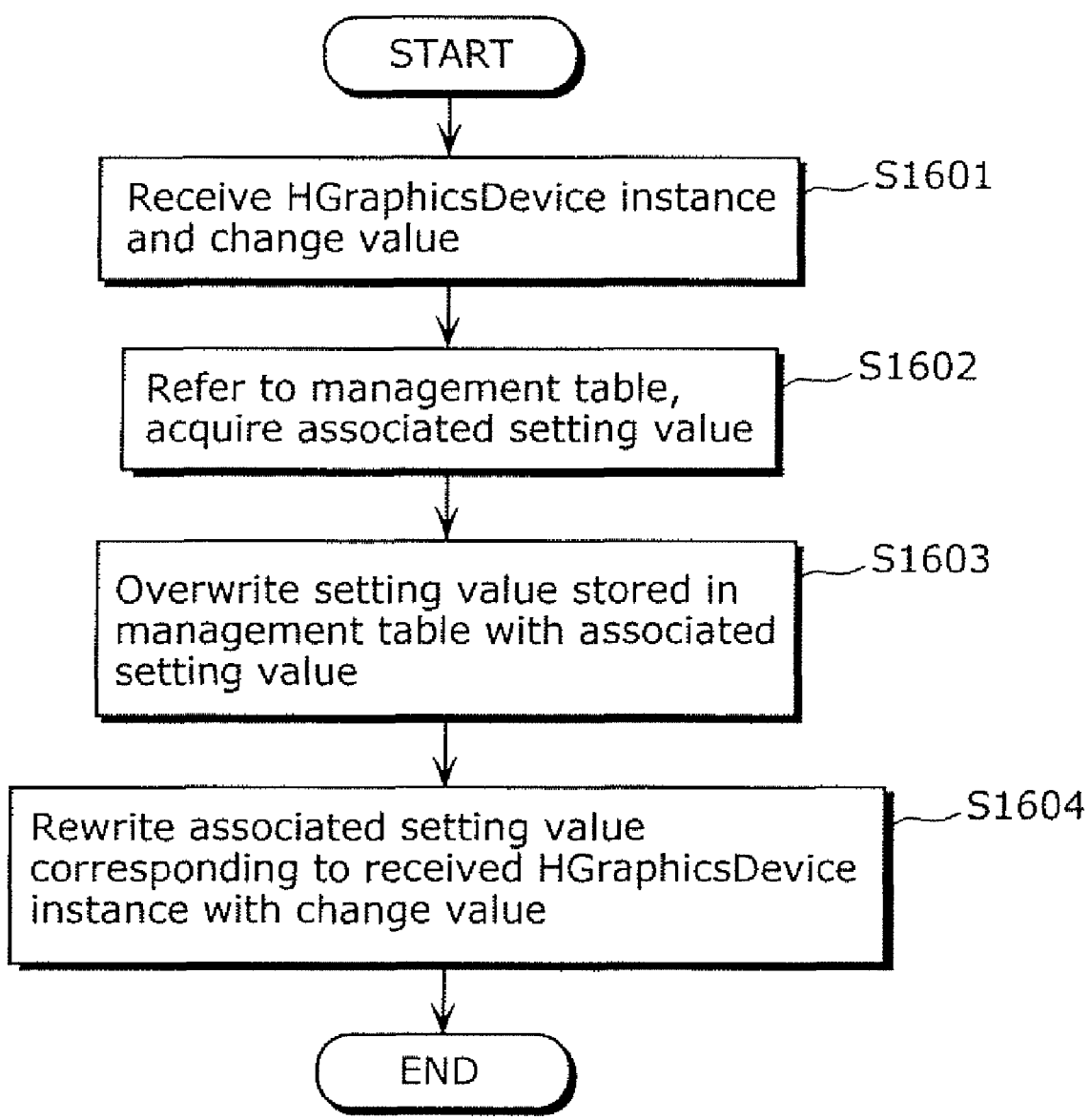
FIG. 18 is a flowchart showing an operation of a Z-order changing unit according to the first embodiment of the present invention.

FIG. 18 is a flowchart showing an operation of the Z-order changing unit 602. The Z-order changing unit 602 receives a HGraphicsDevice instance and a change value indicating the vertical position to be changed (Step S1601). Referring to the management table managed by the Z-order management unit 601, the Z-order changing unit 602 acquires a setting value (associated setting value) that corresponds to the received HGraphicsDevice instance (Step S1602). Note that the "setting value" is a numerical value stored in a management table in association with an instance, and the "associated setting value" is a setting value associated with the HGraphicsDevice received by the Z-order changing unit 602. At this time, the Z-order changing unit 602 may cause the associated setting value to be stored in the primary storage unit 214. Next, the Z-order changing unit 602 finds, from the management table, a setting value identical to the received change value, which indicates the vertical position, and overwrites that setting value with the associated setting value (Step S1603). Last, the Z-order changing unit 602 overwrites the associated setting value corresponding to the received HGraphicsDevice instance with the received change value (Step S1604).

To be more specific, the HGraphicsDevice instance received from the application 506 is the "HGraphicsDeviceB", the received change value is "1", and the management table is configured as shown in FIG. 10A.

Figure 19:
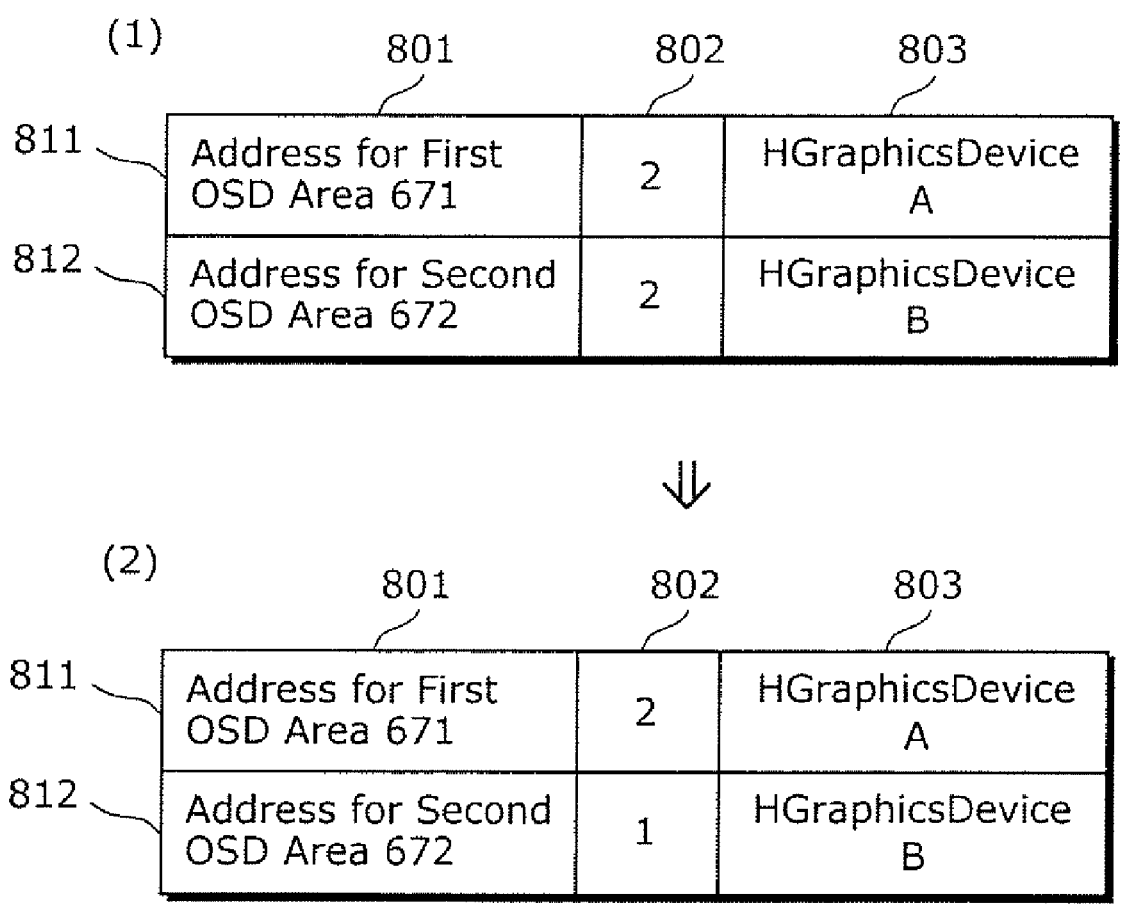
FIG. 19 is a diagram showing a change in a management table according to the first embodiment of the present invention.

FIG. 19 is a diagram showing details of a management table changed as in the abovementioned situation. In this case, the Z-order changing unit 602 refers to the management table shown in FIG. 10A, and acquires the associated setting value "2" that corresponds to "HGraphicsDeviceB" from row 812 of the management table. Next, when the Z-order changing unit 602 searches the management table for a setting value identical to the change value "1", which indicates the vertical position, it finds this setting value in row 811. Here, as shown in FIG. 19 (1), the Z-order changing unit 602 rewrites the setting value "1" in line 811 with the acquired associated setting value of "2". Lastly, as shown in FIG. 19 (2), the Z-order changing unit 602 overwrites the associated setting value corresponding to the "HGraphicsDeviceB" in row 812 with the received change value of "1".

Similarly, the Z-order changing unit 612 of the video processing unit 505i has a function for changing the management table of the Z-order management table 611, and the Z-order changing unit 622 of the still processing unit 505*j* has a function for changing the management table of the Z-order management table 621.

By providing the Z-order changing unit 602, Z-order changing unit 612, and Z-order changing unit 622, the application 506 can easily change the vertical order of two images.

Figure 20:
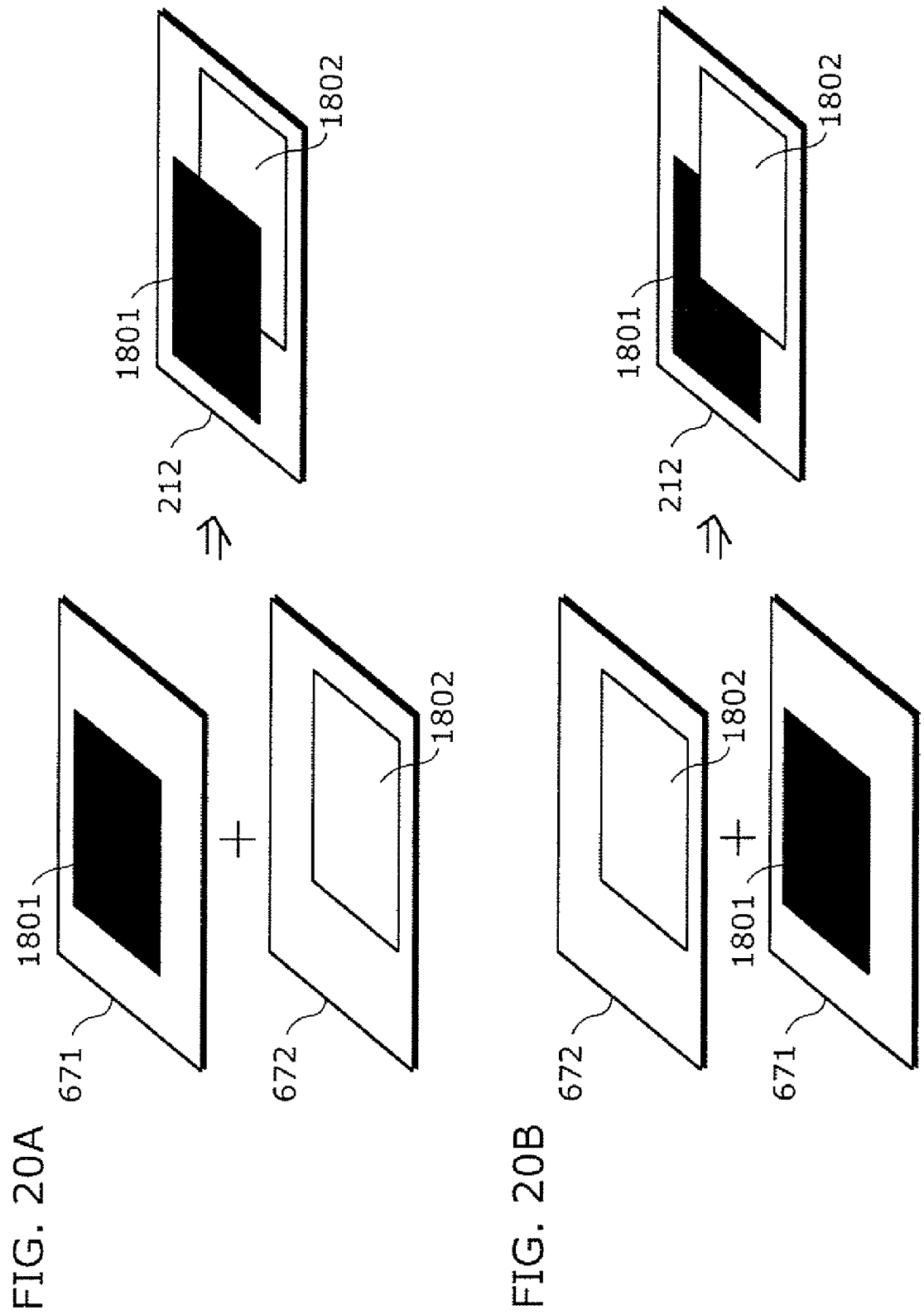
FIG. 20A is a diagram showing two graphics images being superimposed in the first embodiment of the present invention.
FIG. 20B is a diagram showing two graphics images being superimposed so that the vertical order is inverted, in the first embodiment of the present invention.

FIGS. 20A and 20B are diagrams for describing a change in the vertical order of two images. As shown in FIG. 20A, an image including graphics content 1801 is stored in the first OSD area 671. This graphics content 1801 is a window in which various information is displayed. On the other hand, an image including graphics content 1802 is stored in the second OSD area 672. This graphics content 1802 is also a window in which various information is displayed. The first OSD area 671 is above the second OSD area 672 in the vertical order. Therefore, by synthesizing the images in the first OSD area 671 and the second OSD area 672, the display 212 displays the graphics content 1801 and 1802 so that the window of the graphics content 1801 partially overlaps the window of the graphics content 1802. Here, when the window of the graphics content 1802 is to be displayed on top, the application 506 uses the Z-order changing unit 602 to move the second OSD area 672 to the top, as shown in FIG. 20B. As a result, the display 212 displays the graphics content 1801 and 1802 so that the window of the graphics content 1802 partially overlaps the window of the graphics content 1801. In other words, the vertical order of the two areas (images) is changed. Here, at the time of synthesis, the display 212 determines the order of synthesis by referring to the management tables held by the Z-order management unit 601, the Z-order management unit 611, and the Z-order management unit 621.

Note that in this embodiment, changing the vertical order of areas (images) is realized through a method of interchanging the two areas (images).

FIG. 21 is a diagram showing a method for changing the vertical order of areas (images).

For example, as shown in FIG. 21 (1), there are five areas (an area 1901 to an area 1905); the application 506 is to position the area 1902 fourth from the top. In this case, the application 506 interchanges the area 1902 with an area 1904, as shown in FIG. 21 (2). However, the vertical order of areas can be changed through another method.

Figure 22:
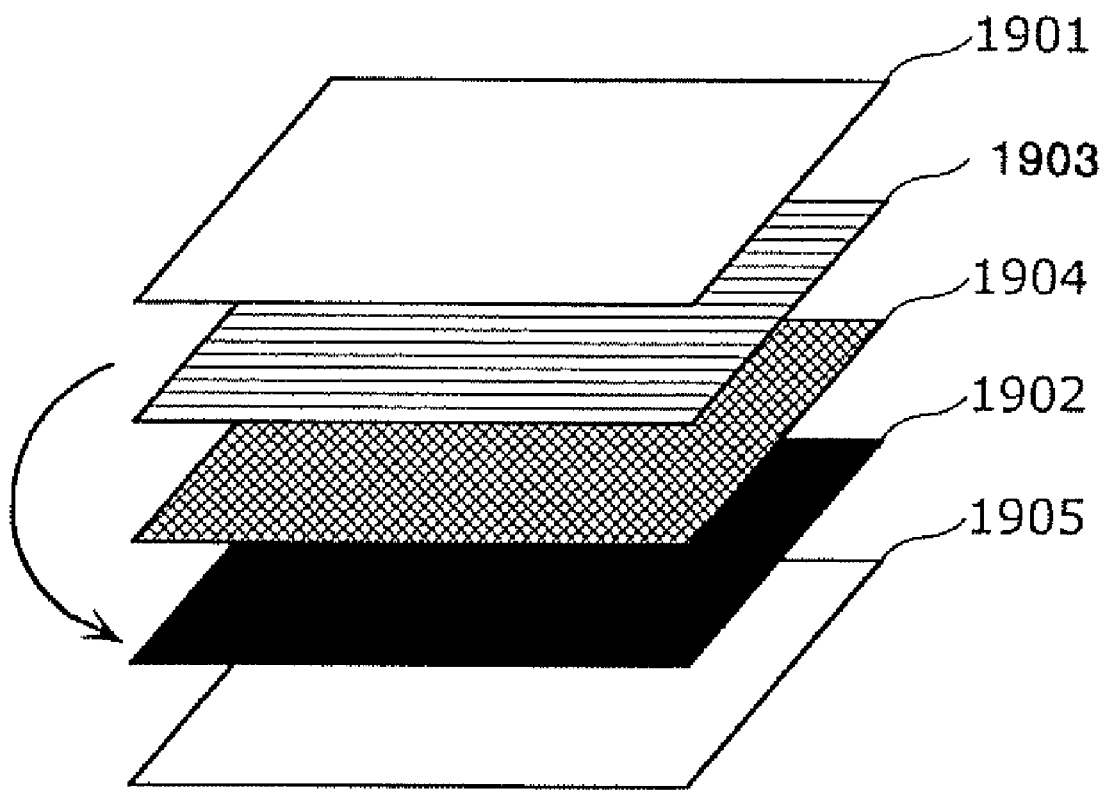
FIG. 22 is a diagram showing another method for changing the vertical order of areas in the first embodiment of the present invention.

FIG. 22 is a diagram showing another method for changing the vertical order of areas.

For example, when the application 506 is to position the area 1902 shown in FIG. 21 (1) fourth from the top, the application 506 inserts the area 1902 below the area 1904.

In the present embodiment, a method called setHGraphicsDeviceZOrder is prepared as the function for providing the Z-order changing unit 602, Z-order changing unit 612, and Z-order changing unit 622; however, a method of a different name may be prepared as long as the function is identical. Also, in the present embodiment, the setHGraphicsDeviceZOrder method, which takes two arguments, is given as an example, but a different API may be provided. For example, a procedure that moves the HGraphicsDevice provided by the argument to the top position (setTopHGraphicsDevice), a method that moves the HGraphicsDevice to the bottom position (setBottomHGraphicsDevice), and so on may be used. The setTopHGraphicsDevice is implemented so as to internally provide a vertical position value of "1" to the setHGraphicsDeviceZOrder method. The setBottomHGraphicsDevice is implemented so as to internally provide a vertical position value equal to the number of areas to the setHGraphicsDeviceZOrder method.

Furthermore, in the present embodiment, specifying instances corresponding to two areas as an argument and interchanging the vertical position of those two areas can be implemented as a method for changing the vertical position of each area in the OSD plane 211, the video plane 209, and the still plane 210. For example, an exchangeHGraphicsDeviceZOrder method is prepared in the HScreen class. This method receives two HGraphicsDevice instances as arguments. Referring to the management table, the vertical positions of the HGraphicsDevices may be acquired, interchanged, and stored within the method. For example, in the case where the management table is configured as shown in FIG. 10A, when the two HGraphicsDevice instances "HGraphicsDeviceA" and "HGraphicsDeviceB" are provided as arguments, and the vertical position value "1" of "HGraphicsDeviceA" and the vertical position value "2" of "HGraphicsDeviceB" are taken; then, "2", which is the vertical position value of "HGraphicsDeviceB", is written as the vertical position value of "HGraphicsDeviceA", and "1", which is the vertical position value of "HGraphicsDeviceA", is written as the vertical position value of "HGraphicsDeviceB". As a result, the management table changes to the state shown in FIG. 19 (2).

In addition, in the present embodiment, the Z-order management unit 601, Z-order management unit 611, and Z-order management unit 621 use an order of storing instances in the array to notify the application 506 of the vertical order of each area in the OSD plane 211, video plane 209, and still pane 210 that correspond to the instances. However, this can be implemented in a different manner. For example, the vertical order can be obtained by providing a method that acquires the vertical order in the instances, and the application 506 calling that method. To be more specific, a getZOrder method is provided in the HGraphicsDevice instance, the HVideoDevice instance, and the HBackgroundDevice instance. This method returns a numerical value that represents a vertical position corresponding to each instance. For example, assuming the management table is configured as shown in FIG. 10A, the getZOrder method of the HGraphicsDevice instance "HGraphicsDeviceA" refers to row 811 of FIG. 10A and returns a value of "1".

Figure 23:
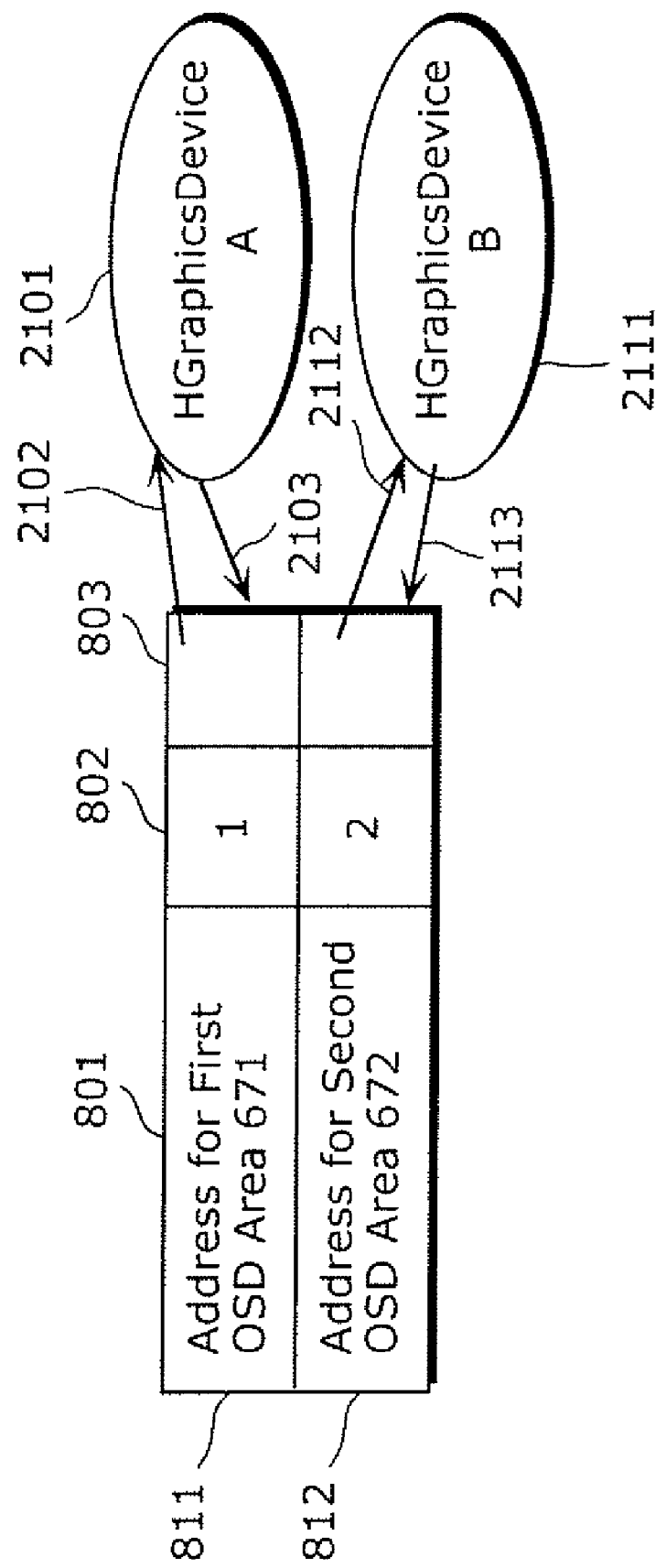
FIG. 23 is a diagram showing another example of a management table that is managed by a Z-order management unit according to the first embodiment of the present invention.

FIG. 23 is a schematic diagram showing a relationship between the management table and the HGraphicsDevice instances for implementing the getZOrder method. Column 803 holds a pointer to an HGraphicsDevice instance. Row 811 holds a pointer 2102 to an HGraphicsDevice instance "HGraphicsDeviceA" 2101, and row 812 holds a pointer 2112 to an HGraphicsDevice instance "HGraphicsDeviceB" 2111. Also, the HGraphicsDevice instances have pointers to their rows in the corresponding management tables. The HGraphicsDevice instance "HGraphicsDeviceA" 2101 has a pointer 2103 to row 811, and the HGraphicsDevice instance "HGraphicsDeviceB" 2111 has a pointer 2113 to row 812. When the getZOrder method of an HGraphicsDevice instance is called, the HGraphicsDevice instance can fetch the value indicating the corresponding vertical position by following the pointer, and return the value to the application 506.

Furthermore, as a different procedure, a getHGraphicsZOrder method, a getHVideoZOrder method, and a getHBackgroundZOrder method may be provided in the HScreen class. Each method can receive the HGraphicsDevice instance, the HVideoDevice instance, and the HBackgroundDevice instance as arguments. Each method respectively refers to the management tables held by the Z-order management unit 601, the Z-order management unit 611, and the Z-order management unit 621, and returns a vertical position value corresponding to the received instance. Through this, by calling the getHGraphicsZOrder method, the getHVideoZOrder method, and the getHBackgroundZOrder method, the application 506 can know the vertical positions of the areas that correspond to each instance.

Note that in the present embodiment, the vertical order has been described as starting with the number "1" and proceeding in the order of "1", "2" and so on, from top to bottom; however, the vertical order may start with the number "0" and proceed in the order of "0", "1", "2", and so on. Also, when the number of areas is N, the vertical order may proceed in the order of "N", "N−1", and so on, from top to bottom. Or, the instances that represent areas may be managed in a list structure, with the order stored in the list structure associated with the vertical order and managed. In addition, in the present embodiment, the management tables shown in FIGS. 10A through 10C are used for managing the vertical order, but the management table may be in any format as long as the areas, information indicating the vertical order, and relation to the instances are stored and are each searchable; a format that utilizes a list structure may be used.

In the present embodiment, three types of planes have been described; however, the number of planes does not have to be three (for example, there is no still plane), and another number of planes, such as four or five, may be used, as long as the vertical order between each plane is set.

Second Embodiment

In the first embodiment, changing the vertical order of the areas within the OSD plane 211 only changed the order within the OSD plane; changes across planes is not possible. However, in the second embodiment, changes across planes is possible.

Figure 24:
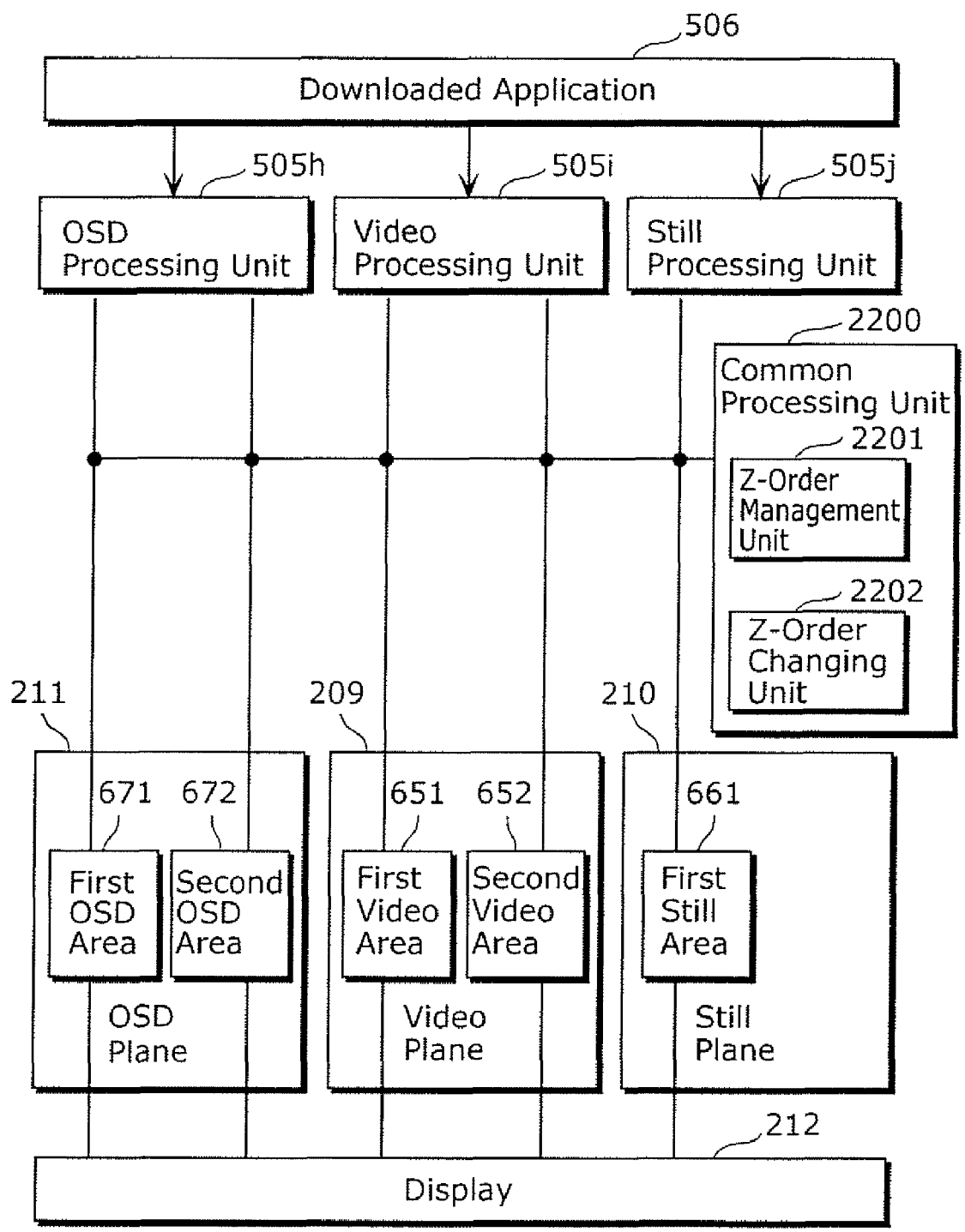
FIG. 24 is a schematic diagram showing a configuration of a display processing device and a downloaded program according to the second embodiment of the present invention.

FIG. 24 is a conceptual diagram showing a relationship between hardware components and software components related to the display function in the terminal apparatus 200 of the present embodiment. In FIG. 24, components given the same numbers as in FIG. 8 represent the same components shown in FIG. 8 in the first embodiment, and thus detailed description shall be omitted. As shown in FIG. 24, the OSD processing unit 505h, the video processing unit 505i, the still processing unit 505j do not each have a Z-order management unit 601, a Z-order changing unit 602, a Z-order management unit 611, a Z-order changing unit 612, a Z-order management unit 621, and a Z-order changing unit 622. Instead, the display processing device includes a common processing unit 2200, which in turn has a Z-order management unit 2201 and a Z-order changing unit 2202. The Z-order management unit 2201 manages, through a management table, areas of the OSD plane 211, the video plane 209, and the still plane 210; information indicating the vertical order of the areas; and instances corresponding to each area.

FIG. 25 is a diagram showing an example of a management table according to the present embodiment. Column 2301 holds addresses to the areas in the OSD plane 211, the video plane 209, and the still plane 210. Column 2302 holds information indicating the vertical order of the area indicated in column 2301. Here, numerical values are stored in column 2302, with the numbers being assigned in order from the top of the vertical order, such as "1", "2"; and so on. Note that this vertical order is a vertical order in which the OSD plane 211, the video plane 209, and the still plane 210 are mixed together. Column 2303 holds the HGraphicsDevice instance, the HVideoDevice instance, and the HBackgroundDevice instance corresponding to the area shown in column 2301. This instance is generated and held when the terminal apparatus 200 is turned on. Information corresponding to the first OSD area 671 of the OSD plane 211 is stored in row 2311; specifically, information indicating that the first OSD area 671 is highest in the vertical order and a corresponding "HGraphicsDeviceA" instance are stored in this row. Here, the letter "A" is simply a letter attached to identify the instance, and has no particular meaning.

Information corresponding to the first video area 651 of the video plane 209 is stored in row 2312; specifically, information indicating that the first video area 651 is second from the top in the vertical order and a corresponding "HVideoDeviceA" instance are stored in this row. Again, the letter "A" is simply a letter attached to identify the instance, and has no particular meaning.

Information corresponding to the second OSD area 672 of the OSD plane 211 is stored in row 2313; specifically, information indicating that the second OSD area 672 is third from the top in the vertical order and a corresponding "HGraphicsDeviceB" instance are stored in this row. Here, the letter "B" is simply a letter attached to identify the instance, and has no particular meaning.

Information corresponding to the second video area 652 of the video plane 209 is stored in row 2314; specifically, information indicating that the second video area 652 is fourth from the top in the vertical order and a corresponding "HVideoDeviceB" instance are stored in this row. Again, the letter "B" is simply a letter attached to identify the instance, and has no particular meaning.

Information corresponding to the first still area 661 of the still plane 210 is stored in row 2315; specifically, information indicating that the first still area 661 is fifth from the top in the vertical order and a corresponding "HBackgroundDeviceA" instance are stored in this row. As before, the letter "A" is simply a letter attached to identify the instance, and has no particular meaning.

When synthesizing and outputting the images shown in the areas of the planes, the display 212 refers to the management table managed by the Z-order management unit 2201, and performs synthesis based on the vertical order. When the management table is configured as shown in FIG. 25, the display 212 superimposes the images shown in each area in order from the bottom, or in other words, the first still area 661, the second video area 652, the second OSD area 672, the first video area 651, and the first OSD area 671, and synthesizes the images.

A method that acquires the vertical order provides each of the abovementioned instances so that the application 506 can know the vertical position of each area. The application 506 can find the vertical order by calling this method. To be more specific, a getZOrder method is provided in the HGraphicsDevice instance, the HVideoDevice instance, and the HBackgroundDevice instance. This method returns a numerical value that indicates a vertical position corresponding to each instance. For example, when the management table is configured as shown in FIG. 25, the getZOrder method of the HGraphicsDevice instance "HGraphicsDeviceB" refers to row 2313 of FIG. 25 and returns a value of "3". Note that the management table of the present embodiment may be configured in the same format as the management table shown in FIG. 23 in the first embodiment. In other words, the getZOrder method is implemented in such a management table, and thus each area and each instance in the management table have mutually referential relationships.

The Z-order changing unit 2202 provides a function for changing the vertical order of the areas managed by the Z-order management unit 2201. For example, the Z-order changing unit 2202 provides a setDeviceZOrder method in the HScreen class. This method accepts an instance as a first argument, and accepts a numerical value indicating the vertical position as a second argument. This numerical value ranges from 1 to the total number of areas held by the OSD plane 211, the video plane 209, and the still plane 210. The operation of the Z-order changing unit 2202 is basically identical to that of the Z-order changing unit 602, the Z-order changing unit 612, and the Z-order changing unit 622 of the first embodiment. The points in which the operation of the Z-order changing unit 2202 differs from that of the Z-order changing unit 602 of the first embodiment are that the corresponding management table is not the management table shown in FIG. 10A, but the management table shown in FIG. 25, and that the Z-order changing unit 2202 handles three types of instances. The manner of changing the vertical order also includes exchanging two areas, moving one area and then shifting the other areas vertically, and so on, as described in the first embodiment. Furthermore, a method that changes the area corresponding to an instance to the highest position or the lowest position may be provided, as described in the first embodiment.

INDUSTRIAL APPLICABILITY

A display processing device according to the present invention has the advantageous effect of being able to improve graphics display performance, and can be applied as a display processing device included in information devices such as personal computers, cellular phones, and so on.

The invention claimed is:

1. A display processor which displays a synthesized superimposed image, based on a program which is downloaded and executed, the display processor comprising:
a downloader operable to download the program;
an executioner operable to execute the downloaded program;
a provider operable to provide, according to a request from the program executed by the executioner, a plurality of graphics areas for storing graphics images, a plurality of video areas for storing video images, and a plurality of still areas for storing still images;
an order storage which stores a specific order of superimposing at least one of the graphics images that is stored in the plurality of graphics areas, at least one of the video images that is stored in the plurality of video areas, and at least one of the still images that is stored in the plurality of still areas;
a notifier operable to provide, to the program executed by the executioner, a notification regarding the specific order stored in the order storage; and
a display operable to superimpose and display the at least one of the graphics images that is stored in the plurality of graphics areas, the at least one of the video images that is stored in the plurality of video areas, and the at least one of the still images that is stored in the plurality of still areas, such that the at least one of the graphics images, the at least one of the video images, and the at least one of the still images are overwritten according to the specific order stored in the order storage to form the synthesized superimposed image,
wherein, in the program executed by the executioner, the at least one of the graphics images is stored in the plurality of graphics areas for storing the graphics images, the at least one of the video images is stored in the plurality of video areas for storing the video images, and the at least one of the still images is stored in the plurality of still areas for storing the still images, in accordance with the specific order stored in the order storage, and
the specific order stored in the order storage can be changed according to the request from the program executed by the executioner to include any one specific order of a total number of possible specific orders of superimposing that may be generated based on the stored graphics images, the stored video images, and stored still images.

2. A display processing method for displaying a synthesized superimposed image, based on a program which is downloaded and executed, said method comprising:
downloading the program;
executing the downloaded program;
providing, according to a request from the executed program, a plurality of graphics areas for storing graphics images, a plurality of video areas for storing video images, and a plurality of still areas for storing still images;
providing, to the executed program, a notification regarding a specific order of superimposing at least one of the graphics images that is stored in the provided plurality of graphics areas, at least one of the video images that is stored in the plurality of video areas, and at least one of the still images that is stored in the plurality of the still areas, the specific order being stored in an order storage; and
superimposing and displaying, by a display processor, the at least one of the graphics images that is stored in the plurality of graphics areas, the at least one of the video images that is stored in the plurality of video areas, and the at least one of the still images that is stored in the plurality of still areas, such that the at least one of the graphics images, the at least one of the video images, and the at least one of the still images are overwritten according to the specific order of superimposing the at least one of the graphics images, the at least one of the video images, and the at least one of the still images to form the synthesized superimposed image, which is displayed on a display,
wherein, in the executed program, the at least one of the graphics images is stored in the plurality of graphics areas for storing the graphics images, the at least one of the video images is stored in the plurality of video area for storing the video images, and the at least one of the still images is stored in the plurality of still areas for storing the still images, in accordance with the specific order of superimposing the at least one of the graphics images, the at least one of the video images, and the at least one of the still images, and
the specific order stored in the order storage can be changed accordingly to the request from the executed program to include any one specific order of a total number of possible specific orders of superimposing that may be generated based on the stored graphics images, the stored video images, and stored still images.

3. A non-transitory computer-readable storage medium encoded with a computer-executable program for displaying a synthesized superimposed image, based on an application program which is downloaded and executed, the computer-executable program causing a computer to execute:
downloading the application program;
executing the downloaded application program;
providing, according to a request from the executed application program, a plurality of graphics areas for storing graphics images, a plurality of video areas for storing video images, and a plurality of still areas for storing still images;

providing, to the executed application program, a notification regarding a specific order of superimposing at least one of the graphics images that is stored in the provided plurality of graphics areas, at least one of the video images that is stored in the plurality of video areas, and at least one of the still images that is stored in the plurality of the still areas, the specific order being stored in an order storage; and superimposing and displaying the at least one of the graphics images that is stored in the plurality of graphics areas, the at least one of the video images that is stored in the plurality of video areas, and the at least one of the still images that is stored in the plurality of still areas, such that the at least one of the graphics images, the at least one of the video images, and the at least one of the still images are overwritten according to the specific order of superimposing the at least one of the graphics images, the at least one of the video images, and the at least one of the still images to form the synthesized superimposed image, wherein, in the executed application program, the at least one of the graphics images is stored in the plurality of graphics areas for storing the graphics images, the at least one of the video images is stored in the plurality of video area for storing the video images, and the at least one of the still images is stored in the plurality of still areas for storing still images, in accordance with the specific order of superimposing the at least one of the graphics images, the at least one of the video images, and the at least one of the still images, and the specific order stored in the order storage can be changed accordingly to the request from the executed program to include any one specific order of a total number of possible specific orders of superimposing that may be generated based on the stored graphics images, the stored video images, and stored still images.

* * * * *